United States Patent
Yamaguchi et al.

(10) Patent No.: US 7,908,314 B2
(45) Date of Patent: Mar. 15, 2011

(54) METHOD FOR CONTROLLING A MANAGEMENT COMPUTER

(75) Inventors: Akihiko Yamaguchi, Kawasaki (JP); Atsushi Hatakeyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 912 days.

(21) Appl. No.: 11/312,394

(22) Filed: Dec. 21, 2005

(65) Prior Publication Data

US 2006/0218279 A1 Sep. 28, 2006

(30) Foreign Application Priority Data

Mar. 23, 2005 (JP) .................................. 2005-083925

(51) Int. Cl.
*G06F 15/16* (2006.01)

(52) U.S. Cl. .................... 709/203; 709/226; 709/215

(58) Field of Classification Search .................. 709/203, 709/226, 238, 105, 106, 201, 202, 223, 224, 709/235, 239; 718/1, 100–108
See application file for complete search history.

(56) References Cited

U.S. PATENT DOCUMENTS

| | | | | |
|---|---|---|---|---|
| 5,031,089 | A * | 7/1991 | Liu et al. | 709/226 |
| 6,578,068 | B1 * | 6/2003 | Bowman-Amuah | 709/203 |
| 6,986,139 | B1 * | 1/2006 | Kubo | 718/105 |
| 7,184,945 | B1 * | 2/2007 | Takahashi et al. | 703/22 |
| 2003/0158940 | A1 * | 8/2003 | Leigh | 709/226 |
| 2003/0172163 | A1 * | 9/2003 | Fujita et al. | 709/226 |
| 2004/0010544 | A1 * | 1/2004 | Slater et al. | 709/203 |
| 2004/0181370 | A1 * | 9/2004 | Froehlich et al. | 702/187 |
| 2004/0181794 | A1 * | 9/2004 | Coleman et al. | 718/104 |

FOREIGN PATENT DOCUMENTS

| | | |
|---|---|---|
| JP | 2000-276305 A | 10/2000 |
| JP | 2000-285086 A | 10/2000 |
| JP | 2001-216282 | 8/2001 |
| JP | 2002-7238 A | 1/2002 |
| JP | 2004-54575 A | 2/2004 |
| JP | 2004-126982 A | 4/2004 |

OTHER PUBLICATIONS

Mikio Sakaki, Mainframe Performance Evaluation Scheme, Information Processing, Information Processing Society of Japan, Aug. 15, 1996, pp. 746, vol. 37, No. 8.

(Continued)

*Primary Examiner* — Wing F Chan
*Assistant Examiner* — Ruolei Zong
(74) *Attorney, Agent, or Firm* — Mattingly & Malur, P.C.

(57) ABSTRACT

A method for controlling a management computer connected to a server for permitting communications therebetween, wherein the server transmits to a client the result of processing executed in response to each processing request sent from the client. The management computer stores an allowance for a value indicative of a load on the server, receives from the server a value calculated on the basis of the number of processing requests from the client and the value indicative of the load on the server. The management computer calculates an allowance for the value calculated from the number of processing requests, based on the value calculated from the number of processing requests, the allowance for the value indicative of the load, and the value indicative of the load, and transmits to the server the calculated allowance for the value calculated from the number of processing requests.

14 Claims, 19 Drawing Sheets

OTHER PUBLICATIONS

Shigeki Yahagi, Network Monitor Starting with Free-soft [No. 1], Check Basic Node Monitor, Free-soft has Sufficient Practicability, Nikkei System Integration, Nikkei BP, Domestic Technical Magazine 2005-00097-008, Jul. 26, 2004, pp. 176-181, No. 136.

Sinnji Kakishima, Redundancy of Internal Backbone Network, Performing Efficient Traffic Control by Load Balancing, N+1 Network Guide, Domestic Technical Magazine 2003-02379-005, Nov. 1, 2002, pp. 58-63, vol. 2, No. 11, Softbank Publishing Ltd.

Hiromi Komiya, Operation of Server Load Balancer, Interop Magazine, Domestic Technical Magazine 2001-00111-010, Feb. 1, 2001, pp. 82-85, vol. 11, No. 2, Softbank Publishing Ltd.

* cited by examiner

FIG.7

MONITORED DEVICE TABLE 800

| # | IP ADDRESS | TYPE |
|---|---|---|
| 1 | 192.168.1.2 | Web SERVER |
| 2 | 192.168.1.3 | Web SERVER |
| 3 | 192.168.1.10 | LOAD BALANCER |

FIG.8

EVENT SOLUTION TABLE 810

| CONTENTS OF NOTIFICATION | TYPE OF MONITORED DEVICE | SOLUTION |
|---|---|---|
| NOTIFICATION OF INCREASED LOAD | Web SERVER | ADD Web SERVER |
| NOTIFICATION OF INCREASED LOAD | DB SERVER | ADD DB SERVER |
| NOTIFICATION OF FAULT | Web SERVER | DISCONNECT Web SERVER FROM LOAD BALANCER |

FIG.9

WEIGHTING TABLE 830

| SERVER IP ADDRESS | DISTRIBUTION WEIGHTING COEFFICIENT |
|---|---|
| 192.168.1.2 | 10 |
| 192.168.1.3 | 6 |
| 192.168.1.4 | 5 |
| 192.168.1.5 | 8 |
| 192.168.1.6 | 5 |

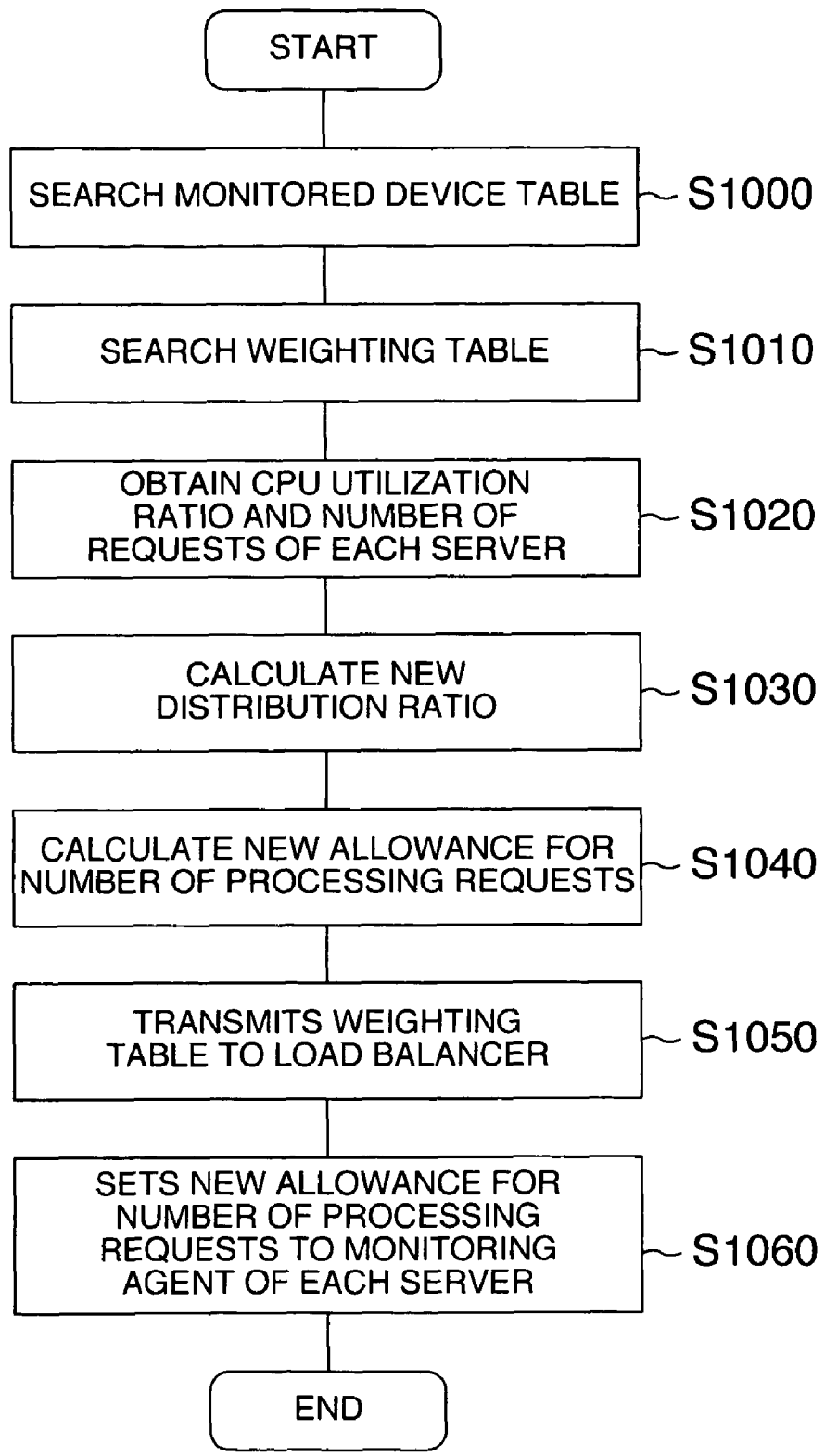

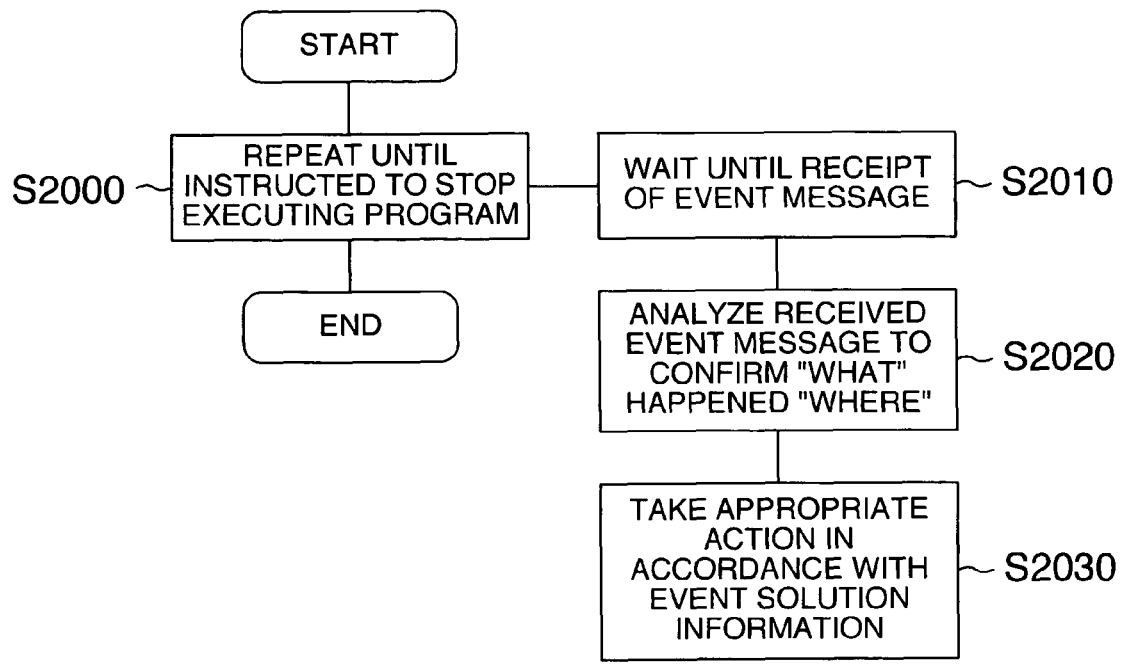

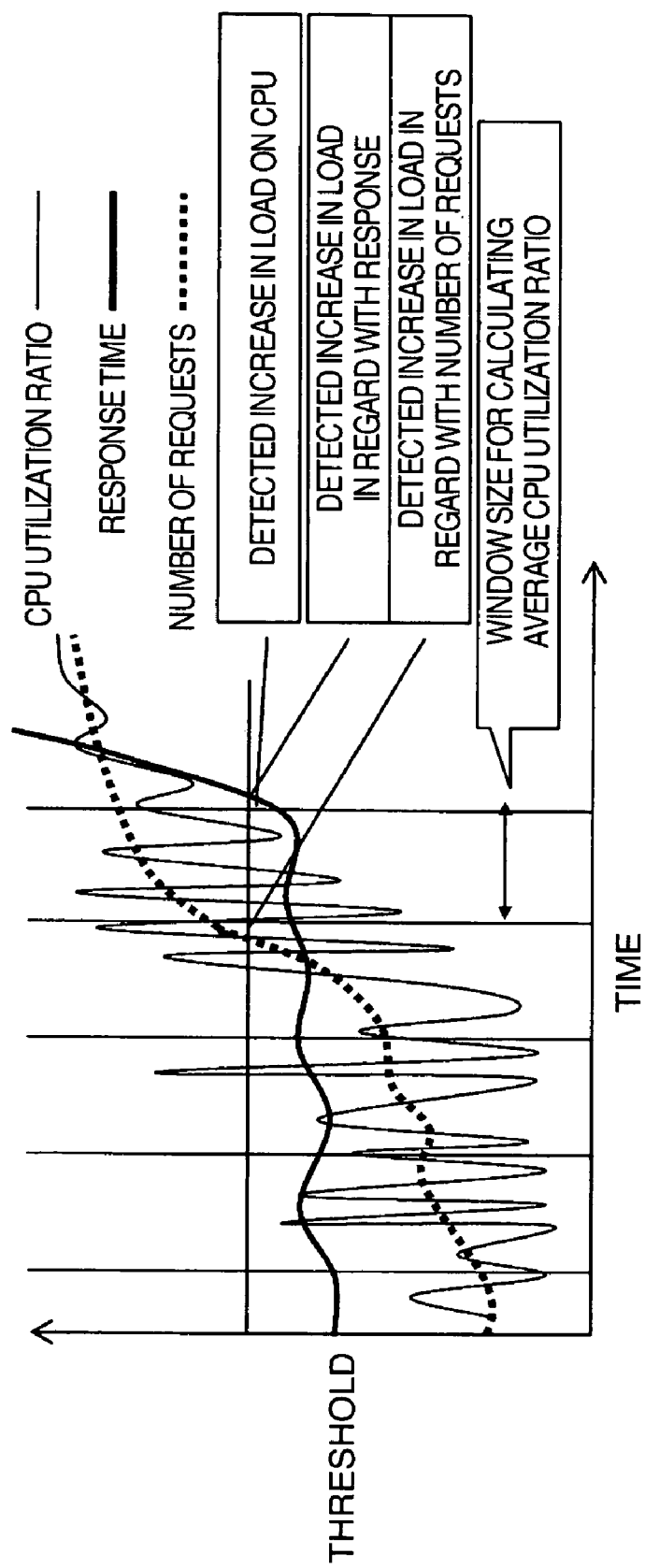

METHOD FOR CONTROLLING A MANAGEMENT COMPUTER

INCORPORATION BY REFERENCE

The present application claims priority from Japanese application JP 2005-083925 filed on Mar. 23, 2005, the content of which is hereby incorporated by reference into this application.

BACKGROUND OF THE INVENTION

The present invention relates to a method for controlling a management computer which can calculate an allowance for detecting fluctuations in a load on a server in accordance with the capabilities of the server and processing contents using an index value which permits a rapid detection of such fluctuations in the load, and a method for controlling a server to detect fluctuations in a load thereon using the index value and allowance.

In recent years, the performance of computers has been rapidly improved by virtue of the advancement of information technologies. In addition, the widespread proliferation has also been found in a form of utilizing a plurality of computers to act as servers for providing information processing services. Further, in this form of utilization, a variety of techniques have been developed for distributing loads on the respective servers (see, for example, JP-A-2001-216282).

However, there are some situations in which it is difficult to predict fluctuations in load beforehand, for example, when information processing services are provided in response to processing requests from clients which are connected through the Internet. In such situations, a sudden increase in load and the like, if any, would be desirably detected without delay such that appropriate actions can be taken therefor.

Generally, a load on a server is often indexed by a CPU (Central Processing Unit) utilization factor. However, since the CPU utilization factor can largely vary in response to even a small fluctuation on load, the CPU utilization factor should be smoothed by taking an average value over a predetermined period, and the like. Therefore, when the CPU utilization factor is relied on to indicate a load, actual sudden fluctuations on load, if any, could not be immediately detected, possibly resulting in difficulties in taking rapid actions to the fluctuations in load.

In an alternative, the number of processing requests received from clients can also be used as the index of a load on a server. In this event, an increase in the load can be immediately detected at the time the number of processing requests exceeds an allowance. However, a load on a server varies depending on the contents of processing requests and the capability of the server even if the same number of processing requests are sent from clients, so that the number of processing requests received from clients cannot be always said to reflect the load on the server.

SUMMARY OF THE INVENTION

The present invention has been made in view of the foregoing problems, and it is a principal object of the invention to provide a method for controlling a management computer which is capable of calculating an allowance for detecting fluctuations in a load on a server in accordance with the capabilities of the server and processing contents using an index value which permits a rapid detection of fluctuations in the load, and a method for controlling a server to detect fluctuations in a load thereon using the index value and allowance.

To solve the above problems, the present invention provides a method for controlling a management computer connected to a server for permitting communications therebetween, wherein the server transmits to a client the result of processing executed in response to each processing request sent from the client. The management computer stores an allowance for a value indicative of a load on the server. The management computer receives from the server a value calculated on the basis of the number of processing requests received by the server from the client, and the value indicative of the load on the server. The management computer calculates an allowance for the value calculated on the basis of the number of processing requests, based on the value calculated on the basis of the number of processing requests, the allowance for the value indicative of the load, and the value indicative of the load. The management computer transmits to the server the calculated allowance for the value calculated on the basis of the number of processing requests.

Other problems disclosed in the present application, and solutions therefor will be made apparent from the following description of embodiments of the invention and the drawings.

BRIEF DESCRIPTION OF THE DRAWINGS

FIG. 7 is a table showing a list of devices under monitoring according to one embodiment of the present invention;

FIG. 8 is a table showing a list of solutions for events according to one embodiment of the present invention;

FIG. 9 is a table showing weights applied to servers according to one embodiment of the present invention;

FIG. 11 is a flow chart illustrating the flow of processing steps in a setting adjustment program according to one embodiment of the present invention;

FIG. 12 is a table showing an event message format according to one embodiment of the present invention;

FIG. 13 is a flow chart illustrating the flow of processing steps in an event solution program according to one embodiment of the present invention;

FIG. 14 is a graph showing exemplary values indicative of a load according to one embodiment of the present invention;

DETAILED DESCRIPTION OF EMBODIMENTS

1. Exemplary General Configuration

Figure 1:
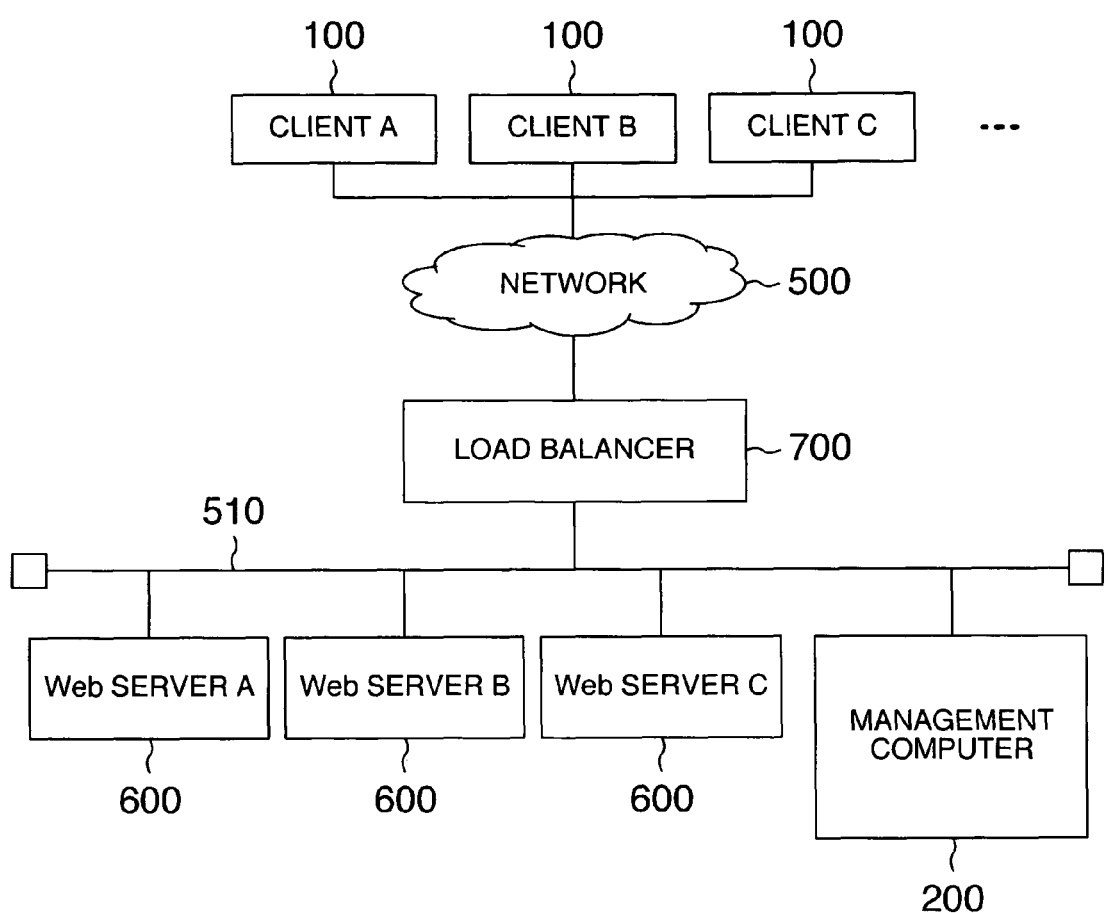
FIG. 1 is a block diagram generally illustrating the configuration of a computer system according to one embodiment of the present invention.

FIG. 1 illustrates the general configuration of a computer system according to one embodiment of the present invention.

The computer system according to this embodiment is an information processing system which is connected to clients 100 through a first network 500 for permitting communications therewith in order to provide a variety of information processing services for the clients 100. The computer system according to this embodiment comprises a management computer 200, a load balancer 700, web servers 600, and a second network 510 which interconnects the management computer 200, load balancer 700, and web server 600 for communications with one another.

Each of the clients 100 is a computer for sending a processing request to an associated web server 600 in order to receive the provision of an information processing service. While FIG. 1 illustrates a client A 100, a client B 100, and a client C 100, the computer system may include one or a plurality of the clients 100.

The web server 600 is a computer for transmitting to a client 100 the result of processing which has been performed in response to each processing request sent from the client 100. While FIG. 1 illustrates a web server A 600, a web server B 600, and a web server C 600, the computer system may include one or a plurality of the web servers 600.

Each of the web servers 600 stores an allowance (also called a "criterion" in some cases) for the number of processing requests received from the clients 100 within a predetermined time period. The allowance may be an upper limit value or a lower limit value for the number of processing requests received from the clients 100 within the predetermined time period. As will be later described in greater detail, the allowance is not limited to the allowance for the number of processing requests received from the clients 100 within the predetermined time period, but may be an allowance for a value which is calculated based on the number of processing requests received from the clients 100. For example, the allowance may be associated with the number of processing requests, among those received from the clients 100, which are currently being processed.

When each web server 600 detects that an upper limit value is exceeded by the number of processing requests sent from the clients 100, the web server 600 transmits a message to the management computer 200 for informing to that effect. In this event, the management computer 200 takes an appropriate action, for example, adding a spare web server 600 to the computer system, and the like. On the other hand, when each server 600 detects, for example, that the number of processing requests falls below a lower limit value, the web server 600 transmits a message to the management computer 200 for informing to that effect. In this event, the management computer 200 takes an appropriate action, for example, removing one of the web servers 600 from the computer system, and the like.

The load balancer 700 is a computer for distributing processing requests sent from the clients 100 to the web servers 600 to the respective web servers 600. Of course, when there is only one web server 600, the load balancer 700 may not be provided in the computer system. Also, even if there are a plurality of the web servers 600, the load balancer 700 may not be provided in the computer system. As will be later described in greater detail, the load balancer 700 stores a distribution ratio in which the load balancer 700 distributes processing requests sent from the clients 100 for transmission to the respective web servers 600. The load balancer 700 forwards the processing requests sent from the clients 100 to the respective web servers 600 in accordance with this distribution ratio. The distribution ratio can be repeatedly updated by the management computer 200, for example, on a periodic basis.

The management computer 200 is a computer for managing the computer system. For example, the management computer 200 calculates and updates the distribution ratio stored in the load balancer 700, and calculates and updates the allowance for the number of processing requests received by each web server 600 from the clients 100 within a predetermined time period. The management computer 200 also performs such operations as the addition and removal of the web server 600. Details on the management computer 200 will be described later.

The first network 500 is a communication network for interconnecting the clients 100 and the computer system for permitting communications therebetween. The first network 500 may be WAN (Wide Area Network) such as the Internet, or an intra-enterprise communication network.

The second network 510 is a communication network for interconnecting the load balancer 700, web servers 600, and management computer 200 for permitting communications with one another. In this embodiment, while the first network 500 and second network 510 are separate networks, they may be the same network.

2. Configuration of Components

Next, a description will be given of the configuration of each of the client 100, management computer 200, web server 600, and load balancer 700.

Each of the client 100, management computer 200, web server 600, and load balancer 700 is based on a computer, so that they are basically similar in hardware configuration. Therefore, the hardware configuration of these components is collectively illustrated in FIG. 2. Also, control programs and tables for implementing functions of these components are shown in FIGS. 3 to 9.

<Configuration of Management Computer>

The management computer 200 comprises a CPU 210, a memory 220, a port 230, a recording medium reader 240, an input device 250, an output device 260, and a storage device 280.

The CPU 210, which governs the control of the overall management computer 200, provides a variety of functions, which should be performed by the management computer 200, by reading a management computer control program 900, a setting adjustment program 910, and an event solution program 920, stored in the storage device 280, into the memory 220 and executing these programs. The programs 900-920 are comprised of codes for performing a variety of operations according to this embodiment. For example, the CPU 210 executes the management computer control program 900 and setting adjustment program 910, and cooperates with the hardware devices such as the memory 220, port 230, input device 250, output device 260, and storage device 280 to implement a load allowance storage unit, a server information reception unit, an allowance calculation unit, a criterion calculation unit, an allowance transmission unit, and a criterion transmission unit. Here, the load allowance storage unit stores an allowance for values indicative of loads on the respective web servers 600. This allowance is set, for example, by a system manager, and stored in the memory 220 of the management computer 200. The allowance for a value indicative of a load on a web server 600 may be represented by a CPU utilization ratio which is, for example, 80% or less. The server information reception unit receives from each of the web servers 600 a value calculated on the basis of the number of processing requests received by the web server 600 from the clients 100, and a value indicative of a load on the web server 600. The value calculated on the basis of the number of processing requests received by the web server 600 from the clients 100 acts as an index value for use in determining whether or not a message should be transmitted to the management computer 200. The index value may be, for example, the number of processing requests received from the clients 100 within a predetermined time period, or the number of processing requests which are currently being processed. The allowance calculation unit calculates an allowance for the value calculated on the basis of the number of processing requests based on the value calculated based on the number of processing requests, the allowance for the value indicative of a load, and the value indicative of the load. This allowance may be, for example, 150 processing requests or less per minute which are received from the clients 100. The criterion calculation unit calculates a criterion for use in determining whether or not the web server 600 should transmit a message to the management computer 200 based on the value indicative of a load on the web server 600, the index value, and the allowance for the value indicative of the load on the web server 600, stored in the load allowance storage unit. This criterion is the same as the allowance for the value calculated on the basis of the number of processing requests. The allowance transmission unit transmits the calculated allowance for the value calculated on the basis of the number of processing requests to the web server 600. The criterion transmission unit transmits the calculated criterion to the web server 600. The memory 220 may be implemented, for example, by semiconductor storage devices.

The management computer control program 900 controls the management computer 200, for example, as an operating system. The management computer control program 900 controls a variety of hardware devices and software included in the management computer 200. Also, the management computer control program 900 enables the management computer 200 to communicate a variety of data, for example, to and from the web servers 600 and load balancer 700.

The setting adjustment program 910 calculates an allowance for the number of processing requests received by each web server 600 from the clients 100 within a predetermined time period, and the distribution ratio stored in the load balancer 700.

The event solution program 920 performs operations in response to a variety of messages transmitted from the web servers 600 to the management computer 200. For example, the event solution program 920 performs the aforementioned addition and removal of the web server 600. The contents of messages received from the web servers 600 and the contents of operations associated therewith are stored in an event solution table 810, later described. FIG. 8 shows an example of the event solution table 810. FIG. 12 in turn shows an example of a message transmitted from the web server 600.

As described above, in this embodiment, the management computer 200 receives a message from one of the web servers 600 to responsively execute the event solution program 920, thereby autonomously controlling the computer system. The autonomous control refers to one type of control which manages a computer system without receiving specific instructions from a system manager. An example of the autonomous control may autonomously accommodate a fault or an increased load occurring in a computer system. For example, when a fault or an increased load is detected in one of the web servers 600, the management computer 200 autonomously estimates the cause for the fault or increased load, selects and takes appropriate measures based on the result, and evaluates the result of the measure. By autonomously executing a sequence of these procedures, the computer system autonomously accommodates a fault and an increased load, which have occurred therein, to reduce a burden on the system manager for the management, reveal the cause earlier, and recover the web server 600 earlier. The autonomous control is implemented by executing the event solution program 920 mutually in association with the setting adjustment program 910 and management computer control program 900.

The recording medium reader 240 is a device for reading a program and/or data recorded on a recording medium 1000. The read program and/or data are stored in the memory 220 and/or storage device 280. Therefore, the management server control program 900, setting adjustment program 910, and event solution program 930, for example, stored on the recording medium 1000 can be read from the recording medium 1000 using the recording medium reader 240, and stored in the memory 220 and/or storage device 280.

The recording medium 1000 may be a flexible disk, a magnetic disk, a compact disc, or the like. The recording medium reader 240 may be built in the management computer 200 or may be externally attached to the same.

Figure 3:
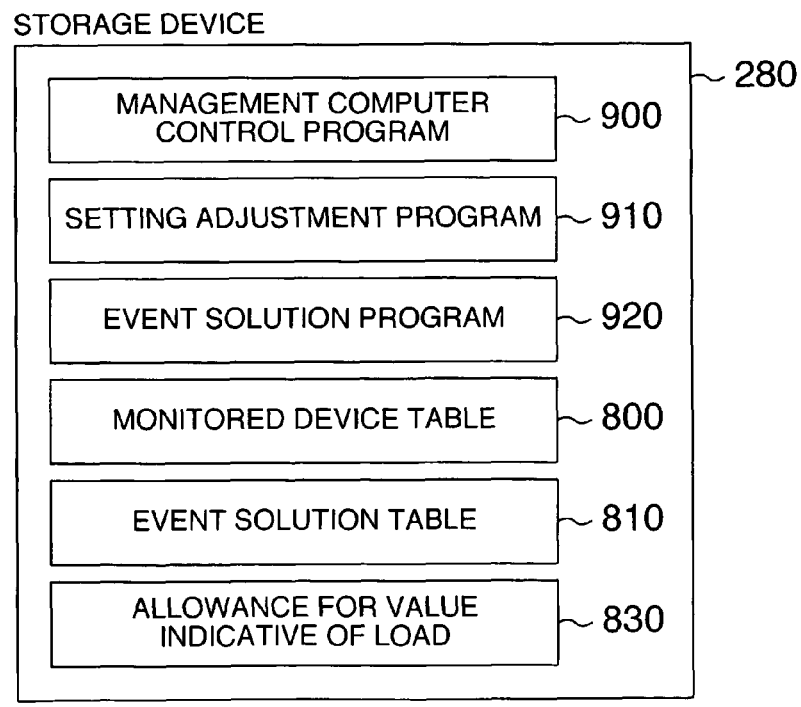
FIG. 3 is a block diagram illustrating a storage device of the management computer according to one embodiment of the present invention.

The storage device 280 may be, for example, a hard disk drive, a semiconductor storage device or the like. The storage device 280 stores the management computer control program 900, setting adjustment program 910, event solution program 920, monitored device table 800, event solution table 810, and allowance 830 for a value indicative of a load. FIG. 3 illustrates how these programs and data are stored in the storage device 280.

The monitored device table 800 describes a list of information indicative of each computer which makes part of the computer system. FIG. 7 shows an example of the monitored device table 800. As shown in FIG. 7, the monitored device table 800 describes, for example, the IP address and type of the web servers 600 and load balancer 700. The monitored device table 800 enables the management computer 200 to keep track of the web servers 600 and load balancer 700 within the computer system and to communicate with the web servers 600 and load balancer 700.

The event solution table 810 describes the contents of each of messages transmitted from the web servers 600, and the contents of an action to be taken by the management computer 200 when the message is received thereby in correspondence to each other. FIG. 8 shows an example of the event solution table 810.

The allowance 830 for the value indicative of a load indicates an allowance for a CPU utilization ratio of each web server 600. This allowance 830 can be set, for example, by the manager of the computer system. Then, the allowance 830 may be set to an appropriate value depending on the operating policy for the computer system and the like. For example, the allowance for the CPU utilization ratio may be set at 80%.

The input device 250 is used to enter data and the like into the management computer 200, and functions as a user interface. The input device 250 may be, for example, a keyboard, a mouse or the like.

The output device 260 outputs information to the outside, and functions as a user interface. The output device 260 may be, for example, a display, a printer or the like.

The port 230 is a device for making communications. For example, communications with other computers such as the web servers 600, load balancer 700 and the like are made through the port 230. Also, the management computer control program 900, setting adjustment program 910, and event solution program 920, for example, may be received from another computer through the port 230 via the second network 510, and stored in the memory 220 and/or storage device 280.

<Configuration of Web Server>

Figure 2:
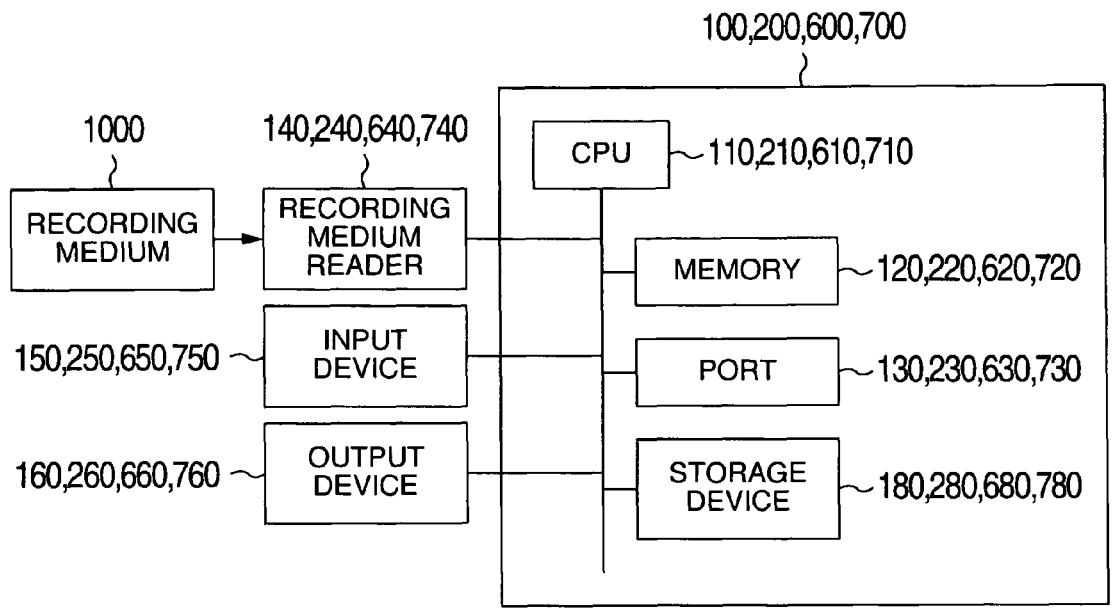
FIG. 2 is a block diagram illustrating the configuration of a client, a management computer, a load balancer, and a web server in the embodiment of FIG. 1.

Next, the configuration of the web server 600 will be described with reference to FIGS. 2 and 4. The web server 600 comprises a CPU 610, a memory 620, a port 630, a recording medium reader 640, an input device 650, an output device 660, and a storage device 680. The functions of these devices are similar to those devices which make up the management computer 200 described above.

Figure 4:
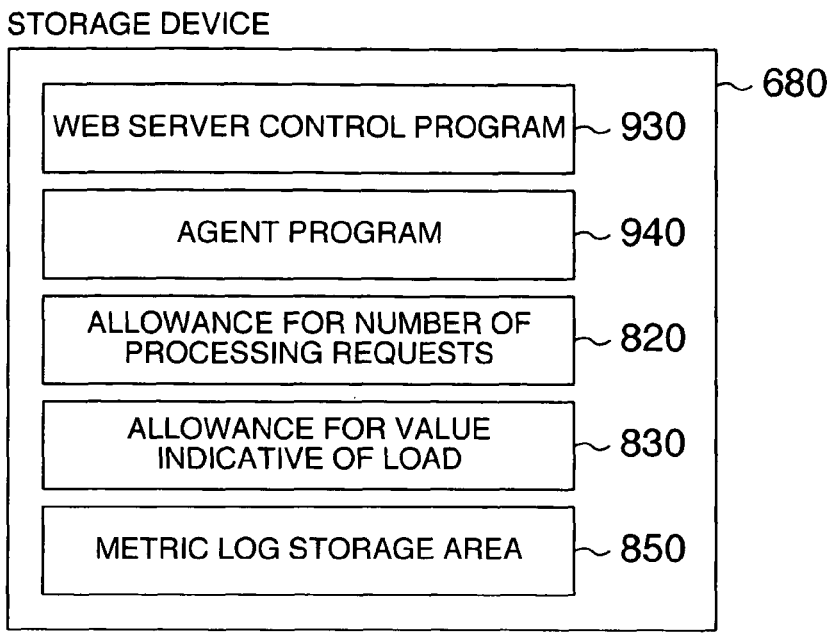
FIG. 4 is a block diagram illustrating a storage device of the web server according to one embodiment of the present invention.

As illustrated in FIG. 4, the storage device 680, which forms part of the web server 600, stores a web server control program 930 and an agent program 940. The CPU 610 executes the web server control program 930 and agent program 940 to implement a variety of functions of the web server 600. For example, the web server control program 930 and agent program 940 executed by the CPU 610 cooperate with hardware devices such as the memory 620, port 630, input device 650, output device 660, storage device 680 and the like to implement an information processing execution unit, a processing request count storage unit, a criterion storage unit, an index value calculation unit, a transmission determination unit, a message transmission unit, and a load detection unit. Here, the information processing execution unit executes information processing in response to a processing request received from a client 100. The processing request count storage unit stores the number of processing requests received from the clients 100. The criterion storage unit stores the criterion for use in determining whether or not a message should be transmitted to the management computer 200. The index value calculation unit calculates an index value for use in determining whether or not a message should be transmitted to the management computer 200 based on the number of processing requests stored in the processing request count storage unit. The transmission determination unit compares the calculated index value with the criterion stored in the criterion storage unit to determine whether or not a message should be transmitted to the management computer 200. The message transmission unit transmits a message to the management computer 200 in accordance with the result of the determination. The load detection unit detects a value indicative of a load on the web server 600.

The web server control program 930 executes information processing which satisfies a processing request sent from the client 100, and returns the result of the processing executed for each processing request to the requesting client 100. The web server control program 930 also provides a function of controlling the web server 600, like an operating system. The web server control program 930 can further have a function of an application program for providing a variety of information processing services for the clients 100.

The agent program 940 collects a variety of information for monitoring the web servers 600, and returns the collected information to the management computer 200. For example, the agent program 940 collects a variety of values indicative of a load on the web server 600 such as the CPU utilization ratio, a CPU utilization time, the amount of used memory, a memory usage rate, the storage capacity of the storage device 680, the amount of data read from and written into the storage device 680, the amount of data transmitted to and received from other computers, a response time from the reception of a processing request from a client 100 to the transmission of the result of processing, the number of processing requests received from the clients 100 within a predetermined time period, and the number of processing sessions currently being executed in response to processing requests received from the clients 100, and a variety of other information related to the occurrence of a fault, anomaly and the like, and transmits the collected information to the management computer 200.

Figure 18:
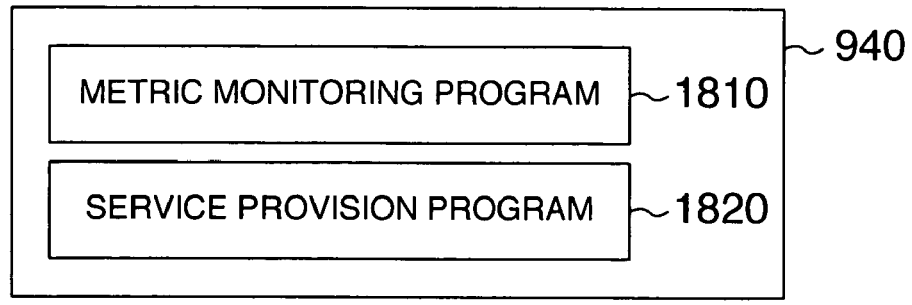
FIG. 18 is a block diagram illustrating the configuration of an agent program according to one embodiment of the present invention.

Here, the agent program 940 is made up of a metric monitoring program 1810 and a service provision program 1820. FIG. 18 illustrates how these programs are arranged in the agent program 940.

Figure 22:
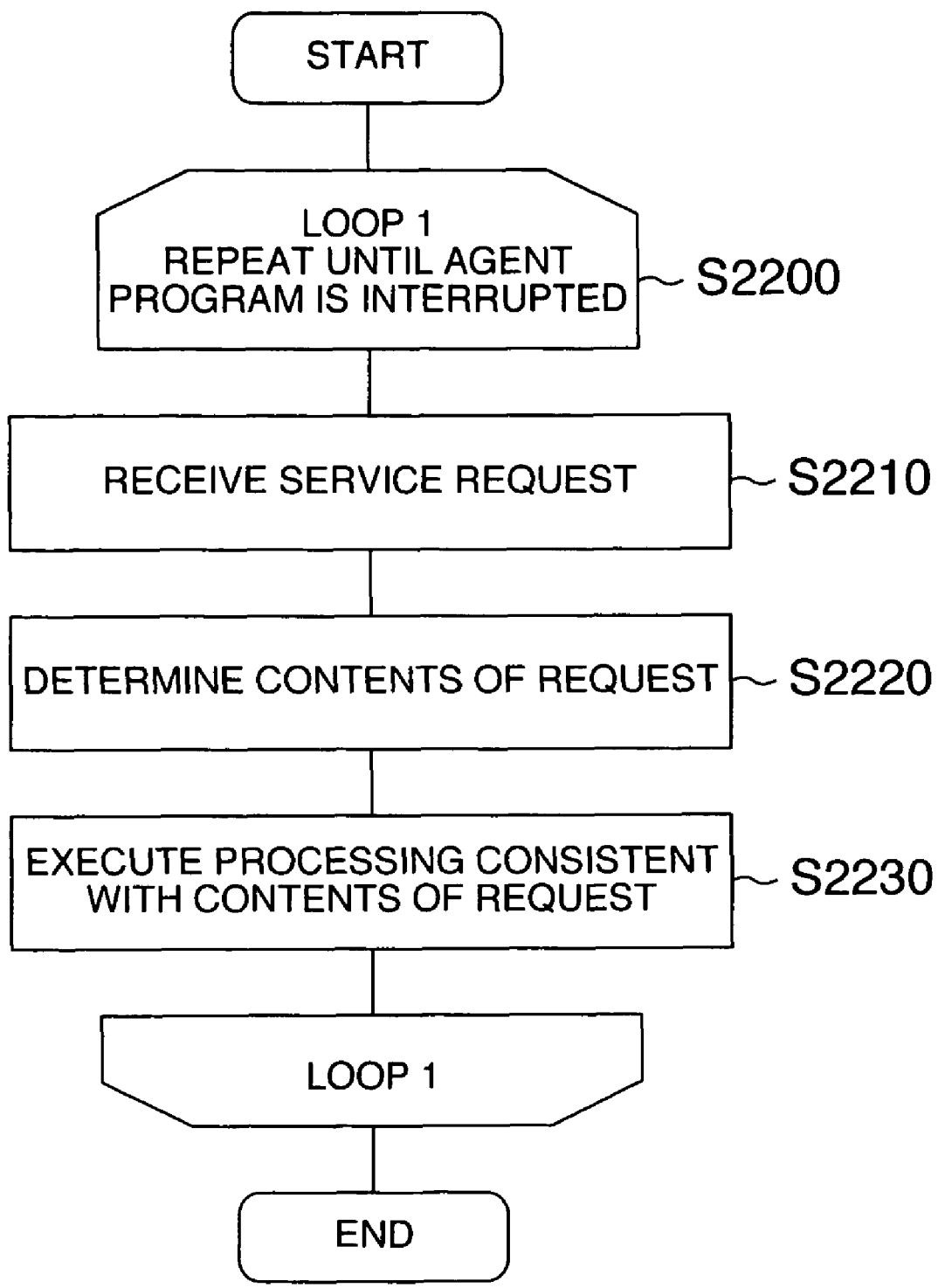
FIG. 22 is a flow chart illustrating the flow of processing steps in a service provision program according to one embodiment of the present invention.

First, FIG. 22 illustrates an exemplary process of the service provision program 1820. The service provision program 1820 is initiated together with the agent program 940, and repeats processing from step S2210 to step S2230 until the agent program 940 instructs the service provision program 1820 to stop the execution (S2200). At step S2210, the web server 600 receives a request from the management computer 200. When a request is sent from the management computer 200, the web server 600 determines the contents of the request (S2220), and executes processing consistent with the contents of the request (S2230).

When the management computer 200 requests the web server 600 to acquire a metric (request for transmission of information for calculating a new criterion), the processing consistent with the contents of the request involves, for example, retrieving data on a specified metric from a metric log storage area 850, later described, and transmitting the retrieved data to the management computer 200. On the other hand, when the management computer 200 requests the web server 600 to set a threshold (allowance), the web server 600 receives a new allowance from the management computer 200 to update a metric monitoring threshold (the allowance 820 for the number of processing requests, or the allowance 830 for the value indicative of a load) to a new threshold.

Figure 19:
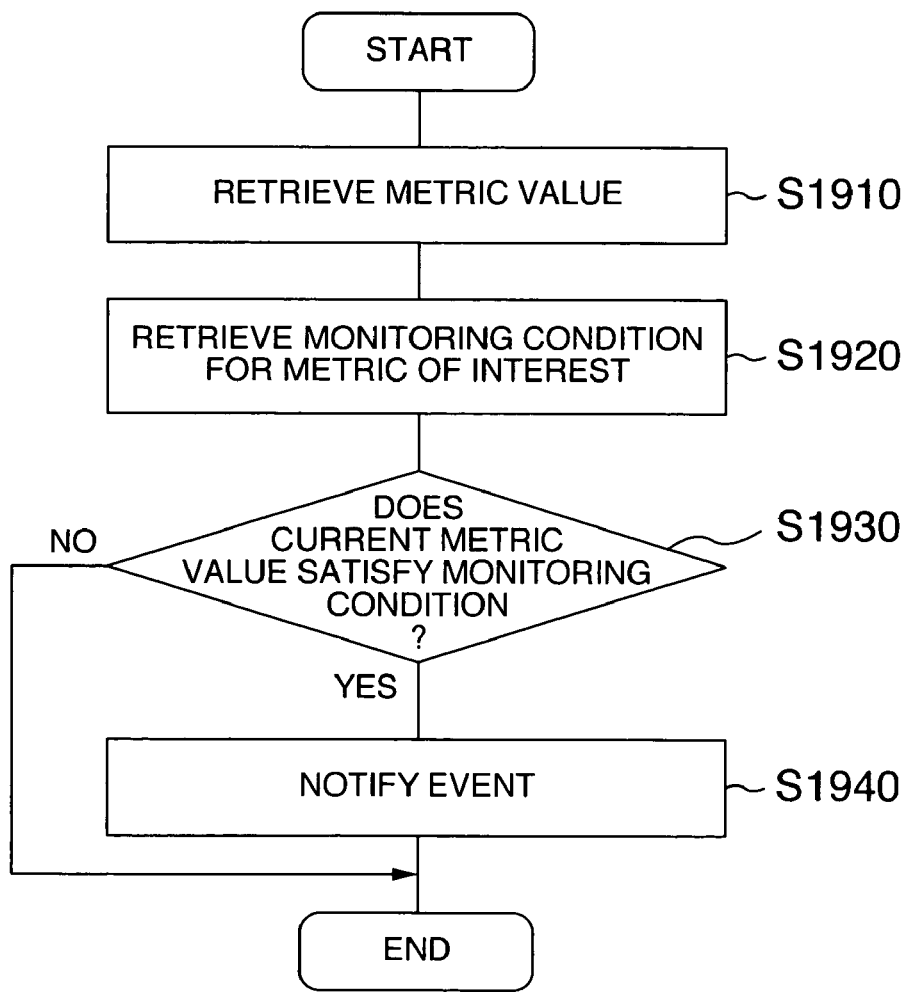
FIG. 19 is a flow chart illustrating the flow of processing steps in a metric monitoring program according to one embodiment of the present invention.

Next, FIG. 19 illustrates an exemplary process of the metric monitoring program 1810. The web server 600 executes the metric monitoring program 1810 to collect, from OS functions and another program for measuring a metric, a value indicative of a load on the web server 600, and a metric value for the value calculated on the basis of the number of processing requests received by the web server 600 from the clients 100 (S1910). The value indicative of a load on the web server 600 may be, for example, the "current CPU utilization ratio." Also, the value calculated on the basis of the number of processing requests received by the web server 600 from the clients 100 may be, for example, the "number of processed requests from the previous inquiry to the current inquiry." Of course, the number of processing requests received from the clients 100 may be used instead. Then, the web server 600 saves these metric values in the metric log storage area 850 as a set of log data and a collected time (S1910). The value calculated on the basis of the number of processing requests received by the web server 600 from the clients 100 is utilized as an index value which is used for determining whether or not a message should be transmitted to the management computer 200. Alternatively, the index value may be calculated by the metric monitoring program 1810 executed by the web server 600. Also, the CPU utilization ratio may be measured each time the metric acquisition request is received from the management computer 200.

Next, the web server 600 retrieves the allowance 820 for the number of processing requests (a criterion for use in determining whether or not a message should be transmitted to the management computer 200), and the allowance 830 for a value indicative of a load (S1920). These values are transmitted when a threshold setting request is sent from the management computer 200, and stored in the storage device 680. Alternatively, these values can be repeatedly transmitted from the management computer 200, for example, on a periodic basis, and updated to new values each time they are transmitted. By doing so, these values can be maintained to reflect an operating condition of the computer system at that time, thus making it possible to more correctly detect fluctuations in the load on the web server 600.

Next, the web server 600 references the log data stored in the metric log storage area 850 to compare the value calculated on the basis of the number of processing requests received within a predetermined time period at a current time with the allowance 820 therefor (S1930). Then, if the value calculated on the basis of the number of processing requests received within the predetermined time period at the current time is larger than the allowance 820 (or smaller than the allowance 820 when the allowance 820 for the number of processing requests indicates a "lower limit value"), the web server 600 determines that a message should be transmitted to management computer 200, and notifies the management computer 200 of the event (transmission of the message) (S1940). The event can be notified by a variety of existing methods such as JMS (Java (registered trademark) Message Service) and the like, so that a description thereon is omitted.

The foregoing process executed by the agent program 940 can be repeatedly executed by a scheduler function of OS (cron and the like of UNIX (registered trademark)), an existing job management program, or the like, for example, on a periodic basis. By doing so, the metric can be monitored repeatedly or on a periodic basis, so that the management computer 200 can be rapidly notified of an event in response to an increased load or a decreased load.

Figure 20:
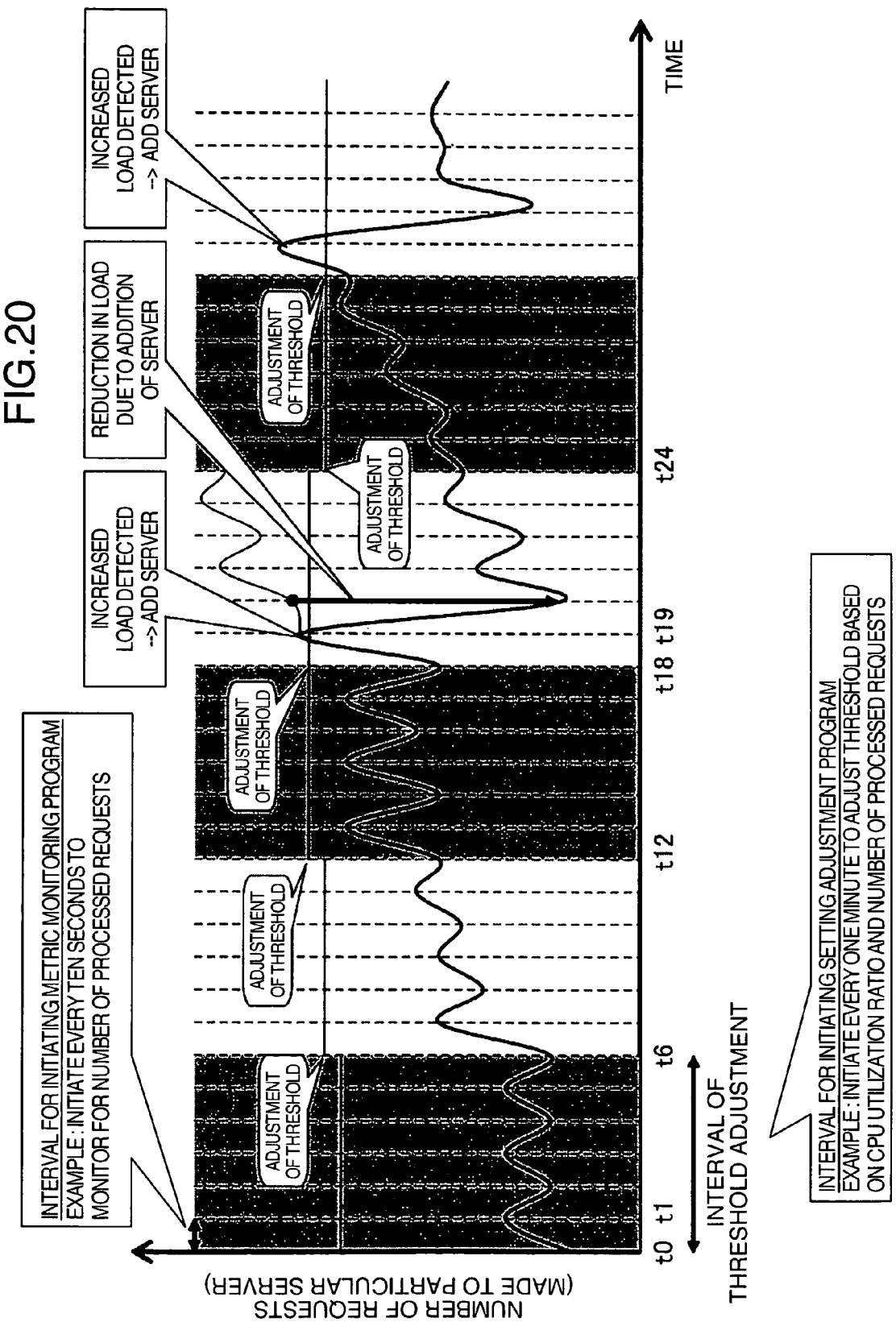
FIG. 20 is a graph representation showing a threshold adjusting interval and a monitoring interval according to one embodiment of the present invention.

FIG. 20 shows an exemplary relationship between intervals at which the metric monitoring program 1810 is executed to monitor the metric and intervals at which the setting adjustment program 910 is executed to adjust the threshold (allowance).

In the example shown in FIG. 20, the metric monitoring program 1810 is initiated at intervals of 10 seconds to monitor the metric, while the setting adjustment program 910 is initiated at intervals of one minute to adjust the threshold based on the CPU utilization ratio and the number of processed requests. In other words, an increase in the load is detected every ten seconds, while a fine adjustment for the threshold is made every minute using the CPU utilization ratio and the number of processed requests. In the example shown in FIG. 20, the load begins to increase from time t18, and the increase is detected at time t19 at which a server is added. Here, supposing that an increase in the load is detected by an average of the CPU utilization ratio for one minute, the detection will be delayed until time t24. In this way, the metric monitoring program 1810 can be initiated at shorter intervals, different from the intervals at which the threshold is adjusted using the CPU utilization ratio, to detect an increase in the load at a more appropriate timing.

Figure 21:
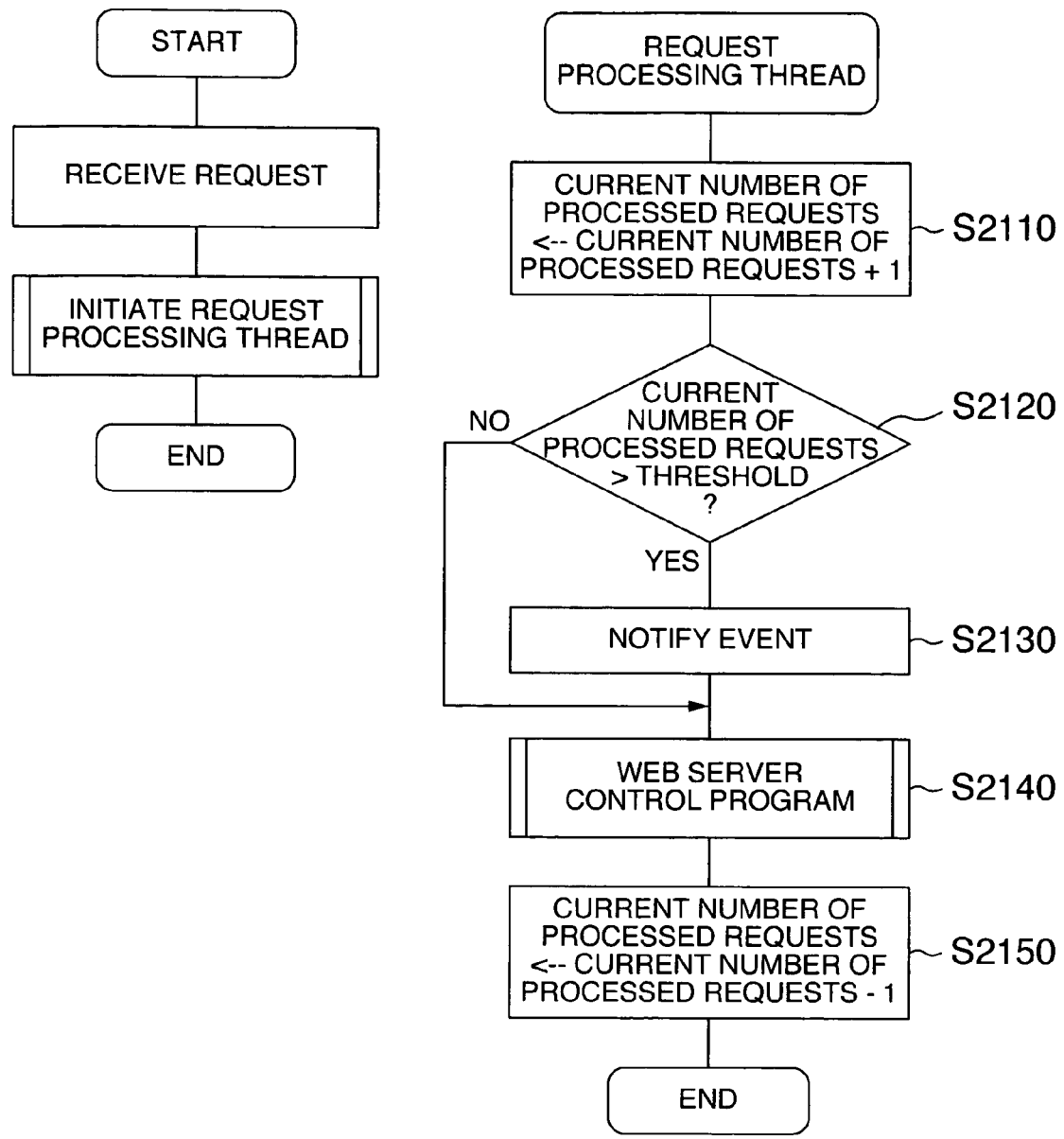
FIG. 21 is a flow chart illustrating the flow of processing steps in a metric monitoring program according to one embodiment of the present invention.

Another method of implementing the detection of fluctuations in the load by the metric monitoring program 1810 can detect such fluctuations at the time the number of requests under processing exceeds a threshold. FIG. 21 illustrates an actual example of the metric monitoring program which can detect an increase in fluctuations in the load at the time the number of requests under processing exceeds a threshold. It should be understood that the present invention is not at all limited by any method of implementing the metric monitoring program 1810.

The web server 600 initiates a request processing thread each time it receives a request (processing request) from the client 100. Upon initiation, the request processing thread counts up (increments) the current number of requests under processing by one (S2110). Then, the web server 600 compares the current number of requests under processing with the threshold (S2120), and determines that an event is notified to the management computer 200 if the current number of requests under processing is larger than the threshold, and notifies the management computer 200 of the event (S2130).

By doing so, the management computer 200 can be immediately notified of an event at the time the current number of requests under processing exceeds the threshold, without relying on the intervals at which an increase in the load is determined.

Here, if the event is notified to the management computer 200 each time the condition is met at step S2120, the event will be notified to the management computer 200 a number of times more than necessary. It is therefore desirable not to again notify the event until the current number of requests under processing has been sufficiently reduced after the event was once notified. For addressing such a situation, when the web server 600 has once notified the management computer 200 of an event, the web server 600 may store information, which indicates that the event was notified, in the storage device 680 or memory 620, such that the web server 600 refrains from notifying the management computer 200 of another event while the information remains stored, irrespective of the result of the comparison of the current number of requests under processing with the threshold. Subsequently, when the current number of requests under processing falls short of the threshold by a predetermined value or more, the information may be erased. By doing so, the web server 600 can avoid unnecessary notification of an event to the management computer 200.

Next, the web server 600 requests the web server control program 930 to process a request (S2140), and counts down the current number of requests under processing by one after it has returned a response to the request (S2150). In this way, an event notified to the management computer 200 can be detected at the time the current number of requests under processing exceeds the threshold.

In the foregoing process, the current number of requests under processing is counted up by one each time the request processing thread is initiated, but alternatively, the number of received requests may be counted up by one each time a request is received from one of the clients 100. In the latter case, fluctuations in load are detected from the result of a comparison of the number of received requests with a threshold, to notify the management computer 200 of an event. In this scenario, since the management computer 200 can be notified of the event without initiating the request processing thread, the event can be more rapidly notified to the management computer 200.

Here, a variety of values can be used for the value indicative of a load on the web server 600, as exemplified above, such as the CPU utilization ratio, CPU utilization time, amount of used memory, and the like. Any of them can be used as an index representative of the load on the web server 600, and has its inherent characteristics, as shown in FIG. 14.

For example, the CPU utilization ratio is characterized by the ability to directly inform the load on the web server 600. Specifically, irrespective of whether a computer provides high performance or not, it is understood that the CPU utilization ratio of 1%, for example, indicates that the web server 600 can still afford to accept additional loads, but the CPU utilization ratio of 99% indicates that the web server 600 is overloaded. On the other hand, the CPU utilization ratio is characterized by a large variation in response to even a slight fluctuation in the load on the web server 600. It is therefore necessary to determine, with extra care, whether or not the web server 600 is really overloaded. When the CPU utilization ratio is used as an index for the load, the condition of the load must be determined by taking an average over a predetermined time period, checking whether or not the threshold is exceeded continuously for a predetermined time period, or the like. Therefore, when the CPU utilization ratio is used as an index for the load, a long time is taken for making the determination. Another index having similar characteristics to the CPU utilization ratio is, for example, the memory usage rate.

Alternatively, a response time from the reception of a processing request from a client 100 to the transmission of the result of requested processing, for example, can be used as an index for the load on the web server 600. The response time is characterized by permitting the user to evaluate the load from a viewpoint near the standpoint of the user. On the other hand, since the response time characteristically becomes longer when the web server 600 is loaded with too much requests to process them, an action therefor would be too late, even though it is taken after the detection of an increase in the load.

Further alternatively, a value calculated on the basis of the number of processing requests received from the clients 100 can be used as an index of a load on the web server 600, including the number of processing requests received from the clients 100 within a predetermined time period, the number of requests currently under processing, and the like. In this event, such a calculated value is advantageously characterized by permitting the user to know the amount of processing currently executed by the web server 600, so that if a threshold (allowance) has been set beforehand, an increase in the load can be detected immediately at the time the web server 600 accepts a number of requests exceeding the threshold. On the other hand, the calculated value is also characterized by difficulties in setting an appropriate threshold because the web servers 600 are loaded in different manners depending on the processing performance and a cost per request of the individual web servers 600 even if they are loaded with the same number of processing requests. Indexes having similar characteristics to the value calculated on the basis of the number of processing requests include, for example, the number of database transactions, the number of connections, and the like.

In this embodiment, an allowance (for example, an upper limit value) has been previously set for the CPU utilization ratio as the allowance 830 for a value indicative of a load on the web server 600, and the number of processing requests received by the web server 600 from the clients 100 within a predetermined time period is multiplied by the ratio of the allowance for the CPU utilization ratio to the average of the CPU utilization ratio of the web server 600 within the predetermined time period to calculate the allowance (upper limit value) 820 for the number of processing requests received by the web server 600 from the clients 100 within the predetermined time period.

In this event, when the web server 600 receives from the clients 100 a number of processing requests exceeding the allowance 820 calculated in the foregoing manner, it can be predicted that the CPU utilization ratio of the web server 600 will exceed the previously set allowance 830. As described above, when the number of processing requests received from the clients 100 is detected to exceed the previously set allowance 820, an immediate determination can be made that the load has increased, so that in this embodiment, the CPU utilization ratio of the web server 600 can be immediately determined to exceed the allowance 830 by detecting that the number of processing requests received by the web server 600 from the clients 100 within the predetermined time period exceeds the calculated allowance 820.

Then, for calculating the allowance 820, the agent program 940 according to this embodiment also calculates an average of the CPU utilization ratio within the predetermined time period. The agent program 940 further compares the number of processing requests received from the clients 100 within the predetermined time period with the calculated allowance 820 for the number of processing requests, and when detecting that the allowance 820 is exceeded, transmits a message to the management computer 200 for informing to that effect as well.

The allowance 820 for the number of processing requests received from the clients 100 within the predetermined time period can also be calculated in the management computer 200 or in each of the web servers 600.

In the former case, each of the web servers 600 transmits to the management computer 200 the average of the CPU utilization ratio within the predetermined time period (ten seconds in the example of FIG. 20), and the number of processing requests received from the clients 100 within the predetermined time period. Then, each web server 600 receives the allowance 820 for the number of processing requests received from the clients 100 within the predetermined time period, calculated by the management computer 200, for storage in the memory 620 and/or storage device 680. Then, each web servers 600 compares the number of processing requests received from the clients 100 within the predetermined time period with the calculated allowance 820 for the number of processing requests, and when detecting that the allowance 820 is exceeded, transmits a message to the management computer 200 for informing to that effect. The allowance 820 may be repeatedly updated, for example, on a periodic basis (for example, every minute in the example of FIG. 20). In this way, even if the contents of processing requests sent from the clients 100 change over time, fluctuations in the load on the web server 600 can be correctly detected by comparing the number of processing requests with the allowance 820.

On the other hand, in the latter case, an allowance for the CPU utilization ratio (for example, 80% indicative of an upper limit value) has been previously set in each of the web servers 600 as the allowance 830 for the value indicative of a load, and the web server 600 calculates an average of the CPU utilization ratio within a predetermined time period. Then, the web server 600 calculates the allowance 820 for the number of processing requests received from the clients 100 within the predetermined time period, and stores the calculated allowance 820 in the memory 620 and/or storage device 680. Then, the web server 600 compares the number of processing requests received from the clients 100 within the predetermined time with the calculated allowance 820 for the number of processing requests, and when detecting that the allowance 820 is exceeded, transmits a message to the management computer 200 for informing to that effect. Like the former case, the allowance 820 can be repeatedly updated, for example, on a periodic basis.

<Configuration of Load Balancer>

Next, the configuration of the load balancer 700 will be described with reference to FIGS. 2 and 5. The load balancer 700 comprises a CPU 710, a memory 720, a port 730, a recording medium reader 740, an input device 750, an output device 760, and a storage device 780. The functions of the respective devices are similar to those of the respective devices included in the management computer 200 described above.

Figure 5:
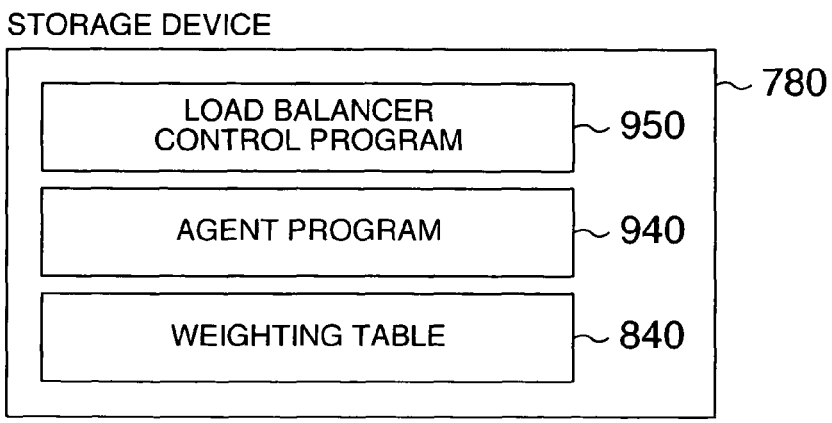
FIG. 5 is a block diagram illustrating a storage device of the load balancer according to one embodiment of the present invention.

As illustrated in FIG. 5, the storage device 780 included in the load balancer 700 stores a load balancer control program 950, an agent program 940, and a weighting table 840. The CPU 710 executes the load balancer control program 950 and agent program 940 to implement a variety of functions provided by the load balancer 700.

The load balancer control program 950 distributes processing requests sent from the clients 100 to the web servers 600 for transmission to the respective web servers 600. The processing requests are distributed in accordance with a distribution ratio stored in the weighting table 840. FIG. 9 shows an example of the weighting table 840. In the example shown in FIG. 9, processing requests sent from the clients 100 are distributed to five web servers (A-E) 600 in a ratio of 10:6:5:8:5. This distribution ratio can be repeatedly updated, for example, on a periodic basis. In this way, even if loading states of the web servers 600 vary over time, processing requests from the clients 100 can be appropriately distributed to the respective web servers 600. The distribution ratio can be updated, for example, by the management computer 200. The load balancer control program 950 also provides a function of controlling the load balancer 700, like an operating system.

The agent program 940 collects a variety of information for monitoring the load balancer 700, and transmits the collected information to the management computer 200. For example, the agent program 940 periodically transmits the distribution ratio stored in the weighting table 840 to the management table 200, and stores a new distribution ratio transmitted from the management computer 200 in the weighting table 840.

<Configuration of Client>

Next, the configuration of the client 100 will be described with reference to FIGS. 2 and 6. The client 100 comprises a CPU 110, a memory 120, a port 130, a recording medium reader 140, an input device 150, an output device 160, and a storage device 180. The functions of the respective devices are similar to those of the devices included in the management computer 200 described above.

Figure 6:
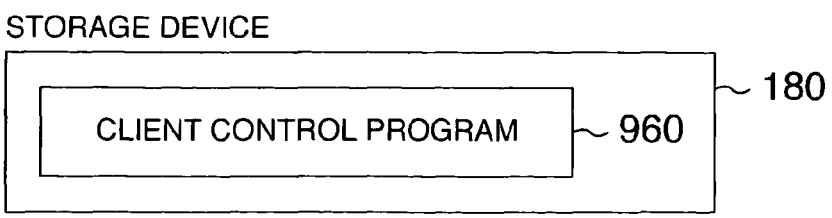
FIG. 6 is a block diagram illustrating a storage device of the client according to one embodiment of the present invention.

As illustrated in FIG. 6, the storage device 180 included in the client 100 stores a client control program 960. The CPU 110 executes the client control program 960 to implement a variety of functions provided by the client 100.

The client control program 960 sends a processing request to the web server 600, and receives the result of requested processing from the web server 600 when an employee of an enterprise or the like utilizes an information processing service provided by the computer system. The client control program 960 can also include a function of conducting control, as does an operating system.

3. Specific Examples of Processes

Figure 10:
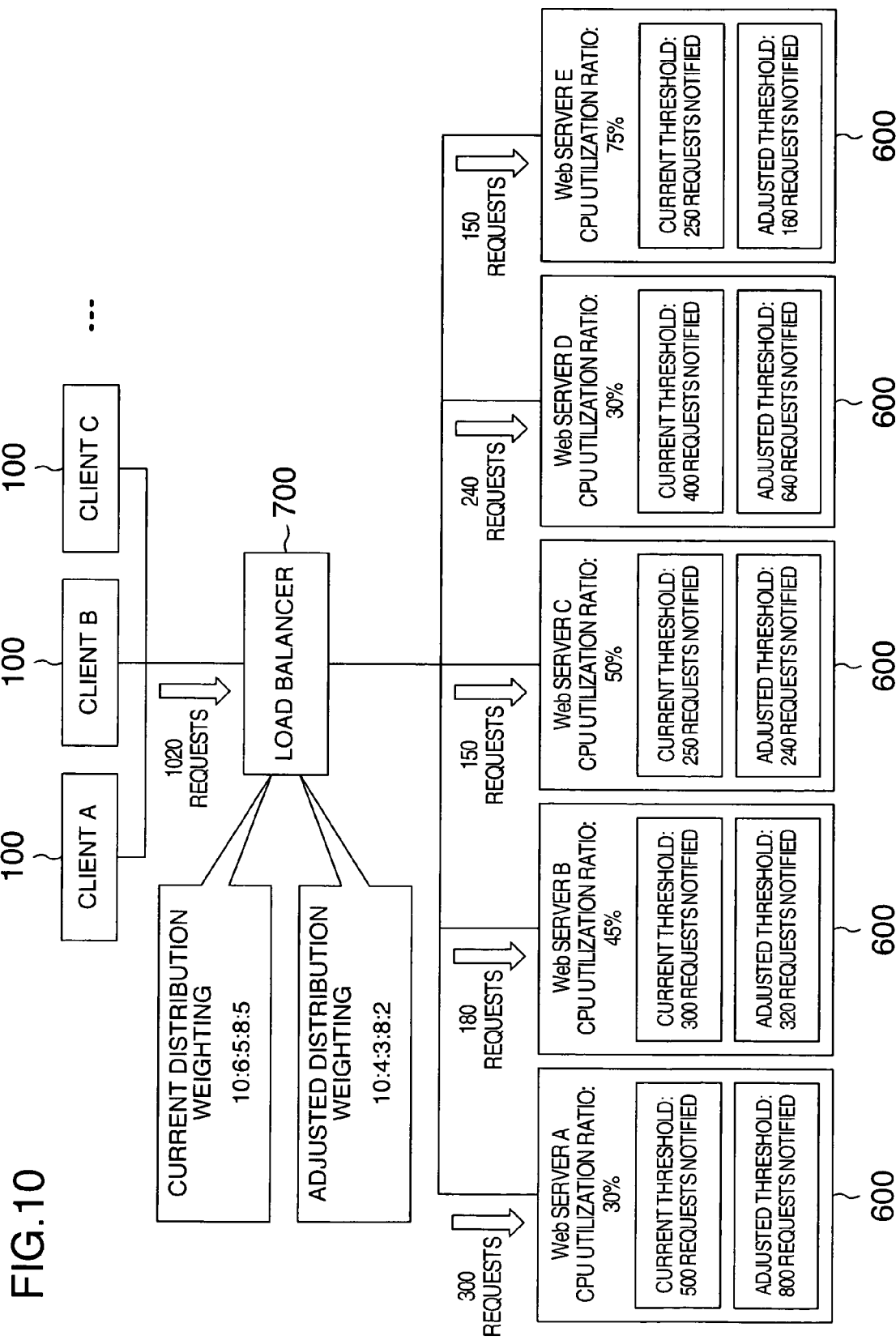
FIG. 10 is a block diagram illustrating a specific example of a processing sequence according to one embodiment of the present invention.

Referring next to FIGS. 10 and 11, a description will be given of specific processes for the calculation of the allowance 820 for the number of processing requests received by the web server 600 from the clients 100 within a predetermined time period, the update of the distribution ratio stored in the load balancer 700, and the like.

In an example illustrated in FIG. 10, each of the clients 100 sends, for example, 1,020 processing requests per minute to the load balancer 700.

Then, in the load balancer 700, a distribution ratio of "10:6:5:8:5" is set for five web servers 600. Accordingly, 300 (1,020*10/34) processing requests are sent to the web server A 600 per minute; 180 processing requests to the web server B 600 per minute; 150 processing requests to the web server C 600 per minute; 240 processing requests to the web server D 600 per minute; and 150 processing requests to the web server E 600 per minute.

Assume herein that average CPU utilization ratios for one minute are 30%, 45%, 50%, 30%, and 75% for the web servers A-E 600, respectively, in the foregoing scenario.

Assume also that the allowances 820 for the number of processing requests received from the clients 100 set to the respective web servers 600 are 500, 300, 250, 400, and 250, respectively.

In the foregoing scenario, the management computer 200 calculates the respective allowances 820 for processing requests received by the respective web servers 600 from the clients 100, and values indicative of the distribution ratio for the load balancer 700 in accordance with a flow chart of the setting adjustment program 910 illustrated in FIG. 11 in the following manner, and sends the respective calculated values to the respective web servers 600 and load balancer 700.

First, the management computer 200 retrieves information such as the IP addresses of the respective web servers 600 and load balancer 700 from the monitored device table 800 (S1000). Then, the management computer 200 retrieves the distribution ratio stored in the weighting table 840 of the load balancer 700 from the load balancer 700 (S1010). Next, the management computer 200 fetches an average CPU utilization ratio for one minute, and the number of processing requests received from the clients 100 for one minute from each web server 600 (S1020).

Then, the management computer 200 calculates values indicative of a new distribution ratio (S1030). The values indicative of the new distribution ratio are derived by calculating "the ratio of the number of processing requests received from the clients 100 for one minute to the average CPU utilization ratio for one minute" for each web server 600, and substituting the respective ratios into the new distribution ratio. Specifically, in the example illustrated in FIG. 10, the values indicative of the new distribution ratio are "(300/30): (180/45):(150/50):(240/30):(150/75)"="10:4:3:8:2."

Next, the management computer 200 calculates the allowance 820 for the number of processing requests received from the clients 100 for one minute for each web server 600 (S1040). Assuming that an allowance of 80% has been previously set in the management computer 200 for the CPU utilization ratio of each web server 600, the management computer 200 calculates a predicted number of processing requests which results in 80% of the CPU utilization ratio, from the received number of processing requests for one minute, and the average CPU utilization ratio for one minute at that time. For example, the management computer 200 calculates 800 (=300*(80/30)) for the web server A 600; 320 (=180*(80/45)) for the web server B 600; 240 (=150*(80/50)) for the web server C 600; 640 (=240*(80/30)) for the web server D 600; and 160 (=150*(80/75) for the web server E 600.

Next, the management computer 200 transmits the new distribution ratio to the load balancer 700 (S1050), and then transmits the calculated allowances 820 for the number of processing requests to the respective web servers 600 (S1060).

In this way, the new distribution ratio and allowances 820 for the number of processing requests can be set in the load balancer 700 and respective web servers 600. These settings can be repeatedly made, for example, every minute.

If the new distribution ratio and allowances 820 for the number of processing requests calculated as described above largely differ from the previously calculated values, such a difference may cause an inconsistent number of processing requests distributed to each web server 600, and an instable load on each web server 600.

To avoid this problem, in this embodiment, the management computer 200 can also calculate a new distribution ratio by averaging the respective values in the distribution ratio calculated as described above and the respective values in the distribution ratio calculated at the previous time. Specifically, the management computer 200 may divide the number of processing requests calculated for each web server 600 at the previous time by the average CPU utilization ratio, and store the resulting values. Then, the management computer 200 may divide the number of processing requests newly calculated for each web server 600 by the average CPU utilization ratio, and take averages of the previous values and new values. The ratio of the respective average values may be used for the new distribution ratio.

Alternatively, the new allowance for the number of processing requests may be calculated by averaging the calculated allowance for the number of processing requests and the previously calculated value.

In this way, each time the management computer 200 updates the distribution ratio and the allowance for the number of processing requests, the values can be smoothly changed to conduct more stable load distribution control.

Of course, the new distribution ratio is not limited to a combination of the averages of the respective calculated values for the distribution ratio and the respective values calculated at the previous time in the distribution ratio, but may be a combination of intermediate values between the respective calculated values for the distribution ratio and the respective values calculated at the previous time in the distribution ratio. Likewise, the new allowance for the number of processing requests is not limited to the average of the calculated allowance for the number of processing requests and the allowance calculated at the previous time.

4. Process upon Detection of Fluctuations in Load

After the allowance 820 for the number of processing requests received from the clients 100 has been set in each web server 600, the web server 600 determines whether or not the number of processing requests from the clients 100 exceeds the allowance 820. This determination can be made by executing the aforementioned agent program 940. When determining that the allowance 820 is exceeded, the web server 600 transmits a predetermined message (for example, a message shown in FIG. 12) to the management computer 200.

The management computer 200 in turn is executing the event solution program 920 in accordance with the flow illustrated in FIG. 13. Upon receipt of the message from the web server 600, the management computer 200 analyzes the received message to confirm "what" happened "in which web server" (S2000-S2020), and takes an appropriate action in accordance with the description in the event solution table 810 (S2030).

The management computer 200 can immediately detect fluctuations in the load on each web server 600 due to a varying number of processing requests sent from the clients 100 to the computer system through the foregoing processes. Then, the aforementioned autonomous control is conducted to enable the computer system to maintain a proper load without specific instructions from the operator. This strategy can improve the reliability of the computer system, and provide high-quality information provision services to users who utilize the computer system through the clients 100.

5. Other Examples

Figure 15:
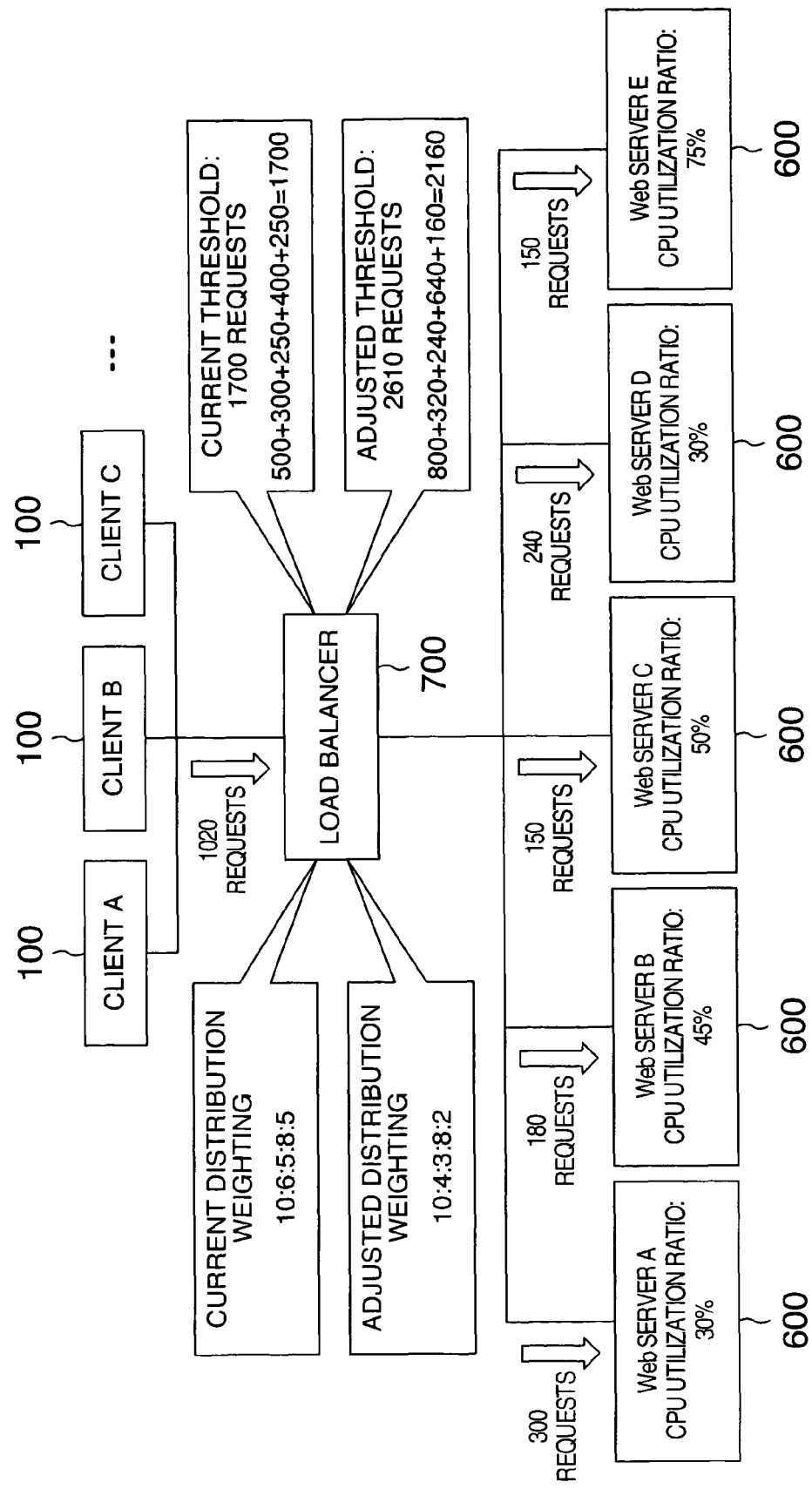
FIG. 15 is a block diagram illustrating another specific example of a processing sequence according to one embodiment of the present invention.
Figure 16:
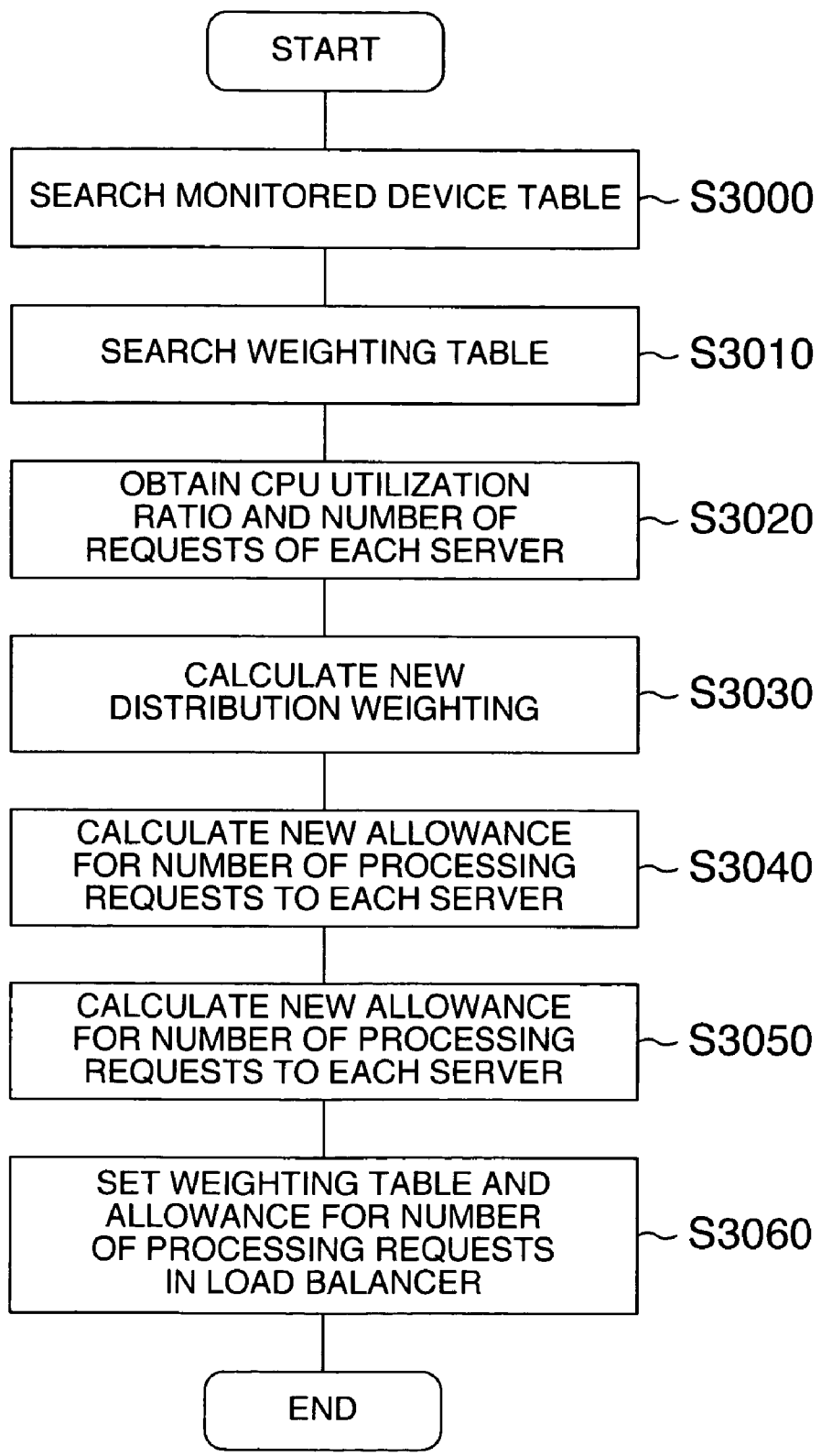
FIG. 16 is a flow chart illustrating the flow of processing steps in a setting adjustment program according to one embodiment of the present invention.

In the foregoing embodiment, the allowance 820 for the number of processing requests from the clients 100 is set in each web server 600 as illustrated in FIG. 10. Alternatively, the allowance 820 may be set as illustrated in FIGS. 15 and 16. Specifically, the allowance 820 for the number of processing requests from the clients 100 may be set for the load balancer 700.

In this event, the management computer 200 first retrieves information such as the IP addresses of the respective web servers 600 and load balancer 700 from the monitored device table 800 (S3000). Then, the management computer 200 retrieves the distribution ratio stored in the weighting table 840 of the load balancer 700 from the load balancer 700 (S3010). Next, the management computer 200 fetches the average CPU utilization ratio for one minute, and the number of processing requests received from the clients 100 for one minute from each of the web servers 600 (S3020).

Then, the management computer 200 calculates a new distribution ratio (S3030). Details of a process for calculating the new distribution ratio are the same as the process illustrated in FIG. 10.

Next, the management computer 200 calculates the allowance 820 for the number of processing requests received from the clients 100 for one minute for each web server 600 in a manner similar to the process of FIG. 10 (S3040). Then, the management computer 200 calculates the total sum of the respective allowances (S3050).

The management computer 200 transmits the total sum of the respective allowances and the new distribution ratio to the load balancer 700 (S3060).

In the example illustrated in FIG. 15, the allowance 820 for the number of processing requests, set in the load balancer 700, can be the total sum of the respective allowances calculated for each web server 600 in FIG. 10. By doing so, the allowance 820 for the number of processing requests sent from the clients 100 can also be set in accordance with loads on the respective web servers 600 which form part of the computer system. Furthermore, at the time the number of processing requests sent from the clients 100 to the load balancer 700 exceeds the allowance 820, fluctuations in load can be immediately detected to take an appropriate action therefor.

Figure 17:
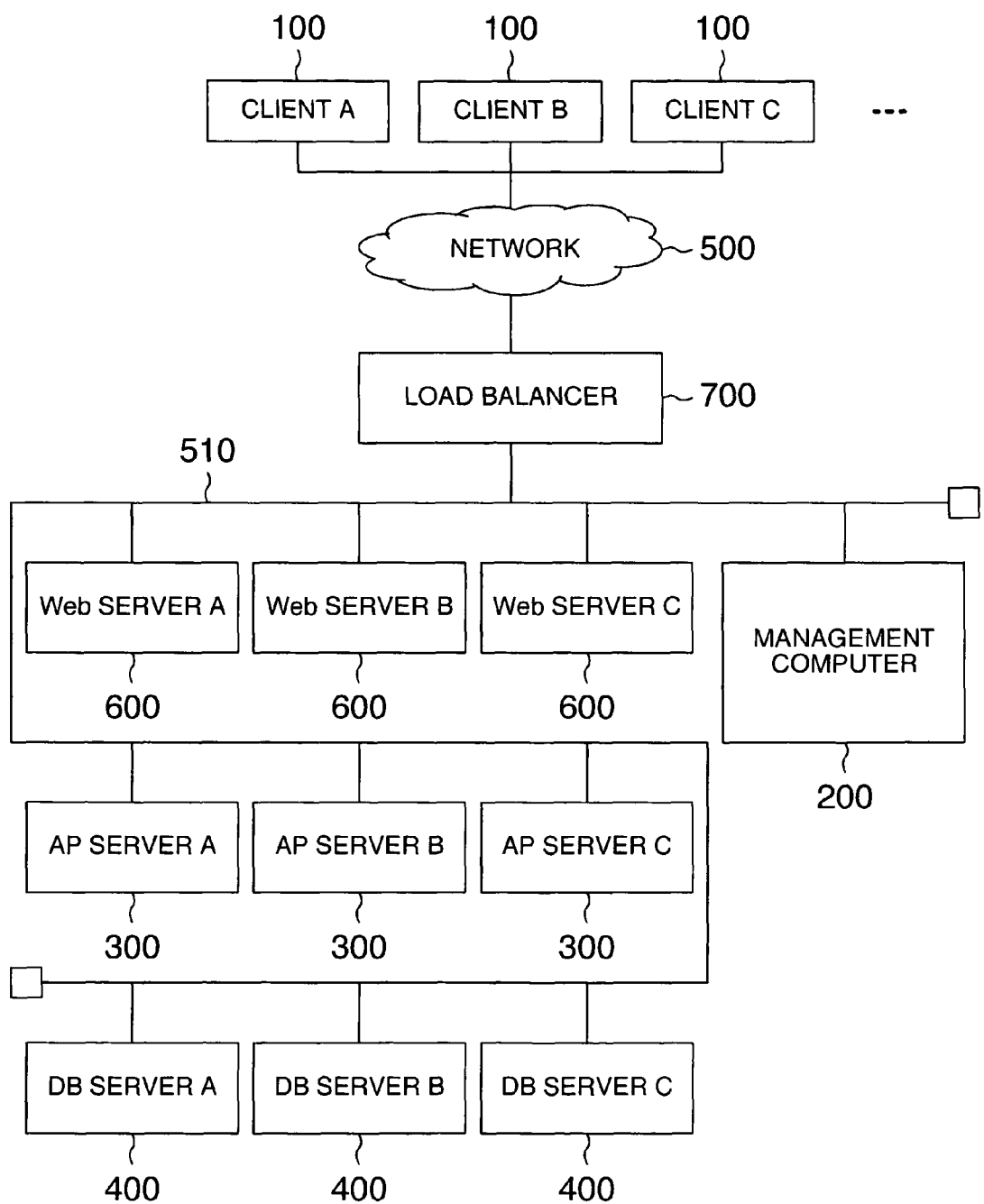
FIG. 17 is a block diagram illustrating another exemplary configuration of a computer system according to one embodiment of the present invention.

The computer system according to this embodiment comprises the management computer 200, load balancer 700, and web servers 600, as illustrated in FIG. 1, and can additionally include an AP server (application server) 300 and a DB server (database server) 400, as illustrated in FIG. 17. The configuration illustrated in FIG. 17 is generally known as a three-layered web system. In this configuration, as a web server 600 receives a processing request from a client 100, the web server 600 sends a request to the AP server 300 for executing information processing consistent with the processing request. Then, the AP server 300 executes the information processing consistent with the processing request, and returns the result of the processing to the web server 600. The web server 600 returns the result of the processing to the client 100. During the execution of the information processing, the AP server 300 sends a request to the DB server 400 as required for reading and writing data from and into a database. The DB server 400 accesses the database in response to the read/write request, and transmits the result to the AP server 300.

Then, each web server 600 stores the allowance 820 for the number of processing requests received from the clients 100 within a predetermined time period, so that when the web server 600 receives a number of processing requests exceeding the allowance 820 from the clients 100, the web server 600 sends a message to the management computer 200. Each AP server 300 stores an allowance for the number of processing requests received from the web servers 600 within a predetermined time period, so that when the AP server 300 receives a number of processing requests exceeding the allowance from the web servers 600, the AP server 300 sends a message to the management computer 200. The DB server 400 stores an allowance for the number of transactions transmitted from the AP servers 300 within a predetermined time period, so that when the DB server 400 receives a number of transactions exceeding the allowance from the AP servers 300, the DB server 400 sends a message to the management computer 200. These allowances may be calculated, in a manner similar to the foregoing, by the management computer 200 based on a value indicative of a load on each server, a value calculated on the basis of the number of processing requests received by each server, and an allowance for the value indicative of the load on each server.

By doing so, each server can immediately transmit a message to the management computer 200 for informing an increase in load when it detects that the number of processing requests exceeds the allowance. Then, upon receipt of the load increase message from any of these servers, the management computer 200 can immediately alleviate the load on the server which has sent the message by adding a spare server to the computer system, and the like. Of course, each server may transmit the load increase message to the management computer 200 when it detects that the current number of processing requests exceeds the allowance.

Figure 23:
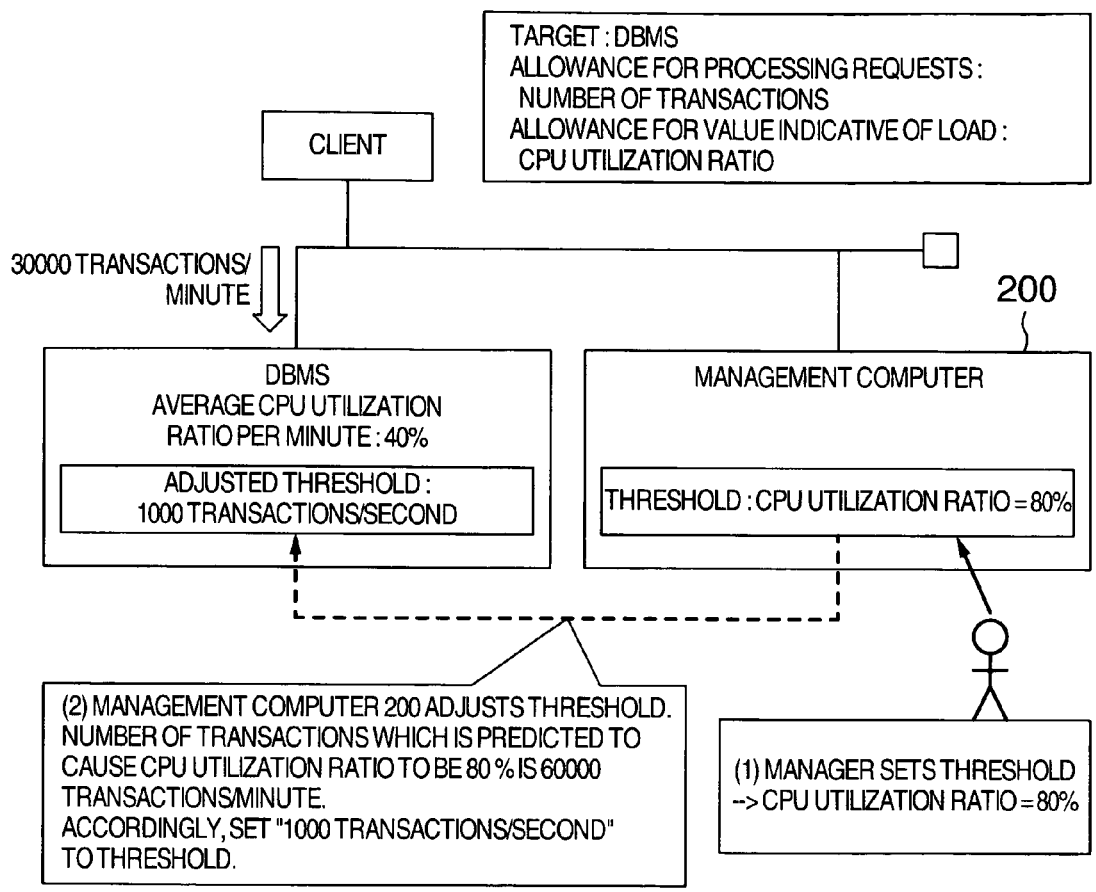
FIG. 23 is a block diagram illustrating an exemplary configuration of a computer system according to another embodiment of the present invention.

Alternatively, the computer system according to the present invention may also be configured as illustrated in FIG. 23 in another embodiment. Specifically, the management computer 200 is connected to a database management server (DBMS). The DBMS receives a transaction (processing request) from a client 100, and transmits the result of executing the transaction to the client 100. The management computer 200 calculates an allowance for the number of transactions received within a predetermined time period based on a value indicative of a load on the DBMS such as the CPU utilization ratio, an allowance therefor, and a value calculated on the basis of the number of transactions received within the predetermined time period in a manner similar to the foregoing embodiment, and transmits the calculated allowance to the DBMS. The DBMS immediately transmits a message to the management computer 200 when it receives a number of transactions exceeding the allowance from the client 100.

Figure 24:
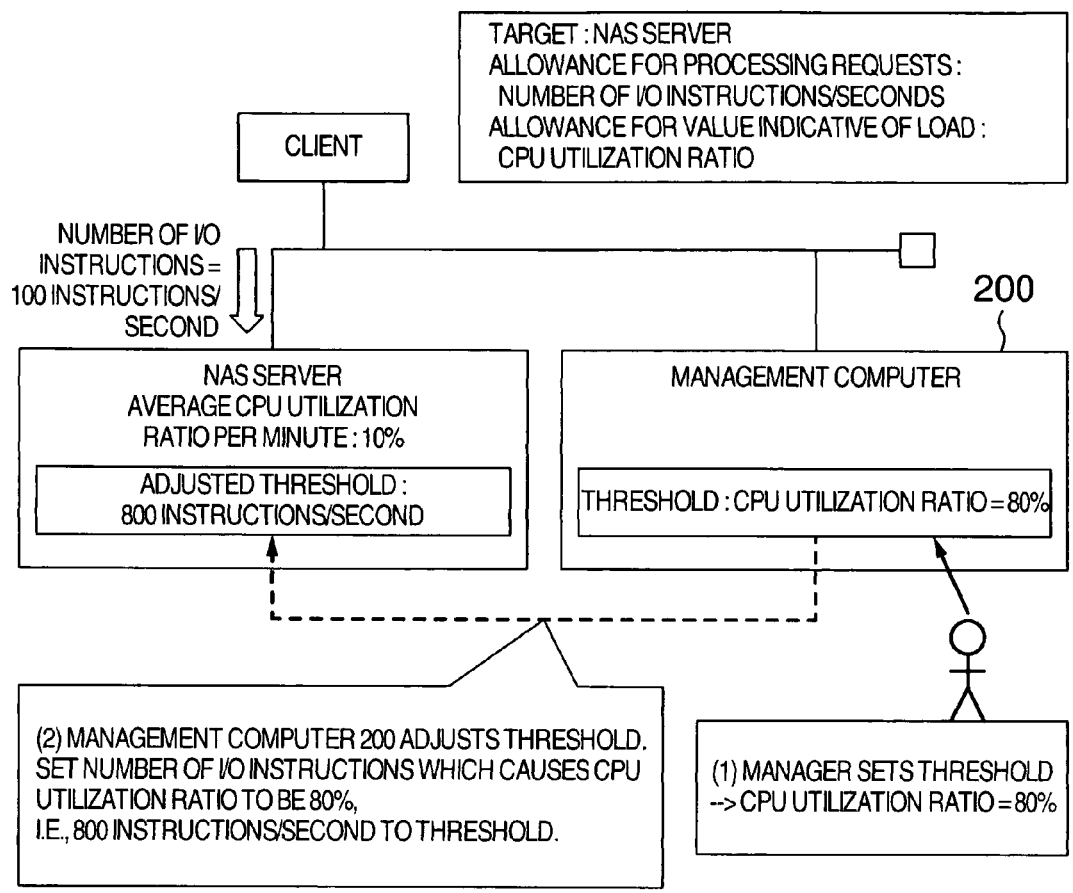
FIG. 24 is a block diagram illustrating an exemplary configuration of a computer system according to another embodiment of the present invention.

Further alternatively, the computer system according to the present invention can be configured as described in FIG. 24 in another embodiment. Specifically, the management computer 200 is connected to a NAS (Network Attached Storage) server. The NAS server receives a data read/write instruction (processing request) from a client 100, and transmits the result of executing the data read/write instruction to the client 100. The management computer 200 calculates an allowance for the number of read/write instructions received within a predetermined time period based on a value indicative of a load on the NAS server such as the CPU utilization ratio, an allowance therefor, and a value calculated on the basis of the number of read/write instructions received within the predetermined time period in a manner similar to the foregoing embodiment, and transmits the calculated allowance to the NAS server. The NAS server immediately transmits a message to the management computer 200 when it receives a number of read/write instructions exceeding the allowance from the clients 100.

Figure 25:
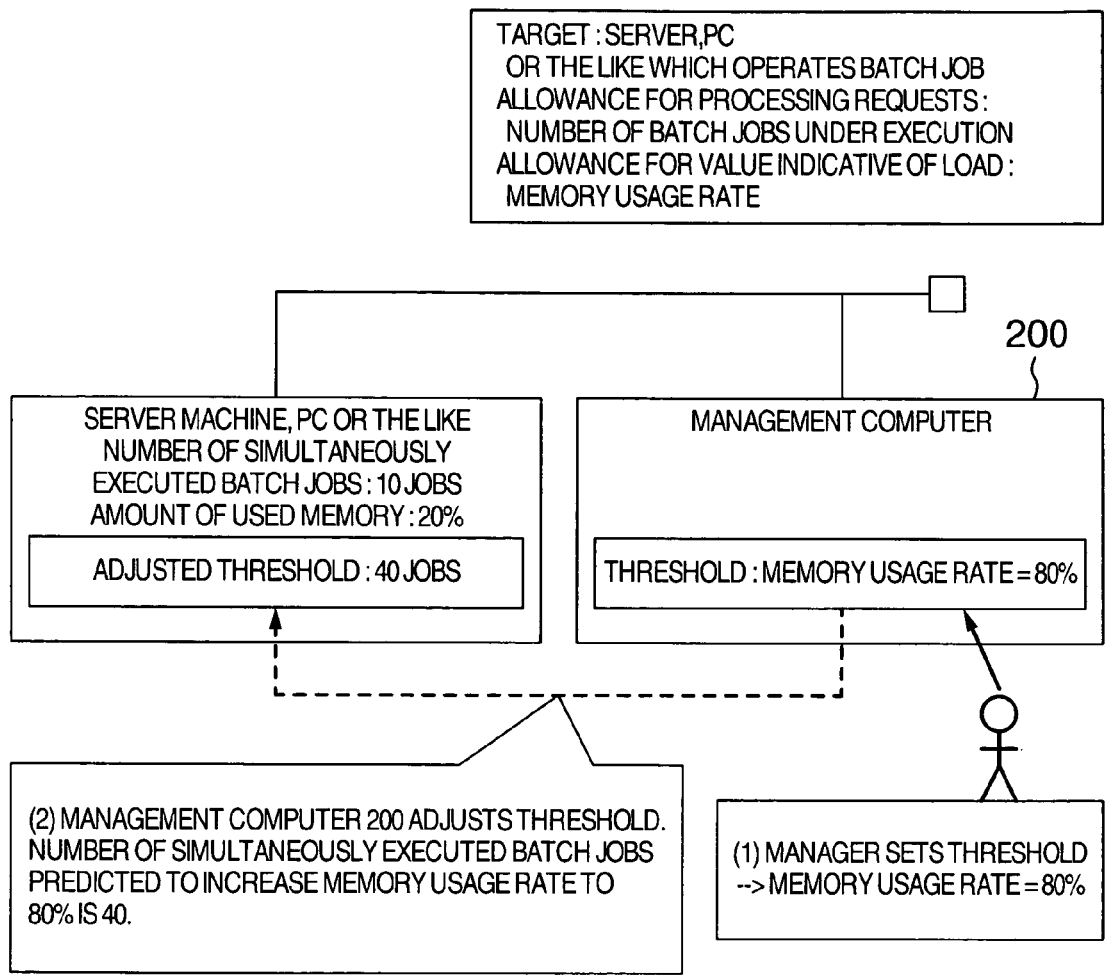
FIG. 25 is a block diagram illustrating an exemplary configuration of a computer system according to another embodiment of the present invention.

Further alternatively, the computer system according to the present invention can be configured as illustrated in FIG. 25 in another embodiment. Specifically, the management computer 200 is connected to a server for executing a batch job and to a personal computer (PC). This server receives a request for batch processing (processing request) from a client 100, and executes the batch processing in response to the request when a predetermined time is reached. The management computer 200 calculates an allowance for the number of batch processing sessions which can be simultaneously executed based on a value indicative of a load on the server such as a memory usage rate, an allowance therefor, and a value calculated on the basis of the number of batch processing requests (for example, the number of currently executed batch processing sessions) in a manner similar to the foregoing embodiment, and transmits the calculated allowance to the server. The server immediately transmits a message to the management computer 200 when it has executed a number of batch processing requests exceeding the allowance.

Figure 26:
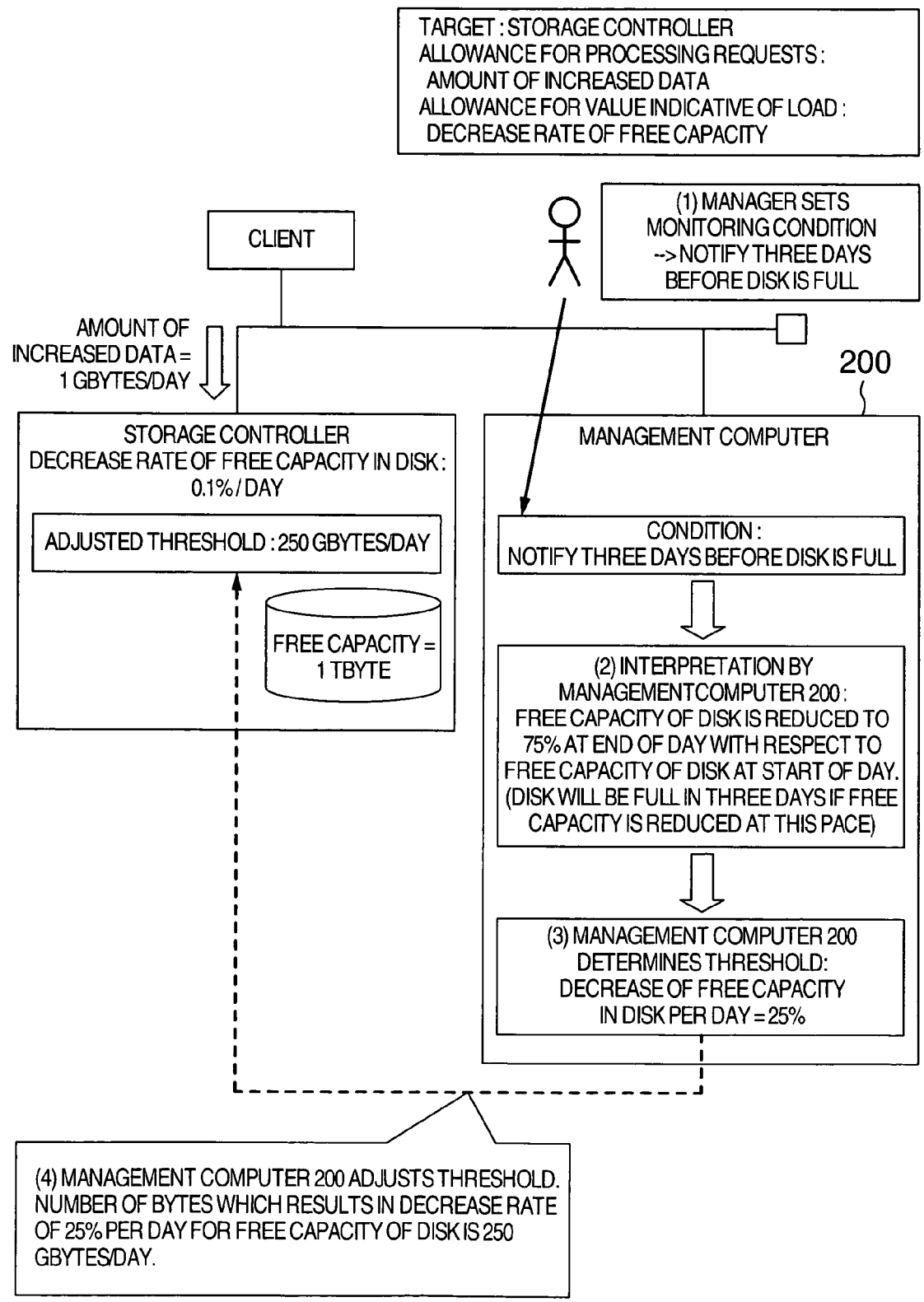
FIG. 26 is a block diagram illustrating an exemplary configuration of a computer system according to another embodiment of the present invention.

Further alternatively, the computer system according to the present invention can also be configured as illustrated in FIG. 26 in another embodiment. Specifically, the management computer 200 is connected to a storage controller. The storage controller receives a data read/write instruction (processing request) from the client 100, and transmits the result of executing the data read/write instruction to the client 100. The storage controller also manages the amount of data stored in a storage device. The management computer 200 calculates an allowance for the amount of increase in data stored in the storage device (250 Gbytes per day) based on a value indicative of a load on the storage controller such as a free capacity decreasing rate of the storage device (0.1% per day), an allowance therefor (25% per day), and a value calculated on the basis of the number of data read/write instructions (for example, the amount of increase in data stored in the storage device (1 Gbytes per day)) in a manner similar to the foregoing embodiment, and transmits the allowance to the storage controller. The storage controller immediately transmits a message to the management computer 200 when it detects an increase in the amount of data exceeding the allowance.

Several embodiments have been described above, wherein according to the present invention, an allowance has been previously set for a value indicative of a load on a server such as the web server 600, and an allowance for a value calculated on the basis of the number of processing requests is calculated on the basis of the value calculated on the basis of the number of processing requests received by the server from the clients 100, the allowance for the value indicative of the load, and a load indicative of the load on the server. Thus, it can be predicted that the value indicative of the load on the server will have exceeded the previously set allowance when the value calculated on the basis of the number of processing requests received by the server from the client 100 exceeds the allowance therefor. Accordingly, since an increase in the load can be immediately determined when it is detected that the allowance is exceeded by the value calculated on the basis of the number of processing requests received from the clients 100, the value indicative of the load on the server can be immediately determined to exceed the allowance by detecting that the calculated allowance is exceeded by the value calculated on the basis of the number of processing requests received by the server from the clients 100. This can lead to an immediate detection of fluctuations in load, thus making it possible to take an appropriate action at an earlier stage, such as addition of a server to the computer system. Particularly, in this embodiment, even if the computer system has a mixture of servers which differ from one another in performance, or even if the clients 100 make accesses at different frequencies in different patterns depending on different time zones or periods, fluctuations in a load on each server can be rapidly detected without the need for complicated settings such as an allowance or a criterion for fluctuations in the load on each server, different settings for respective time zones, and the like.

Further, an increase in load is detected from a value calculated on the basis of the number of processing requests, and the allowance is finely adjusted, for example, on a periodic basis, with reference to the value calculated on the basis of the number of processing requests and a value indicative of a load at that time. In this way, an increase in load can be detected at the time the value calculated on the basis of the number of processing requests exceeds the allowance. Stated in a different way, the fine adjustment of the allowance requires a certain time because the value indicative of the load is required, whereas an increase in the load can be more rapidly detected because of the use of the allowance for the value calculated on the basis of the number of processing requests at that time. Further, the present invention can also support the web servers 600 which differ in processing performance from one another, and variations in the contents of processing from one processing request to another depending on time zones.

In addition, since the distribution ratio of the load balancer 700 is also updated in synchronism with the allowance, it is understood that when the allowance is exceeded by the value calculated on the basis of the number of processing requests received by one server, other servers are also heavily loaded. Therefore, upon receipt of a message from a certain server, the management computer 200 can immediately take an appropriate action such as addition of a server without making a determination as to "whether or not actions such as load balancing should be taken" or the like.

While several embodiments of the present invention have been described above, the foregoing embodiments are not intended to construe the present invention in a limiting sense, but are intended to facilitate the understanding of the present invention. The present invention can be changed and modified without departing from the spirit and scope of the invention, and encompasses its equivalents as well.

In conclusion, the present invention can provide a method for controlling a management computer which can calculate an allowance for detecting fluctuations in a load on a server in accordance with the capabilities of the server and processing contents using an index value which permits a rapid detection of such fluctuations in the load, and a method for controlling a server to rapidly detect fluctuations in a load thereon using the index value and allowance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for controlling a management computer connected to one or more servers for permitting communication therebetween, wherein each of said servers transmits to a client a result of processing for each processing request sent from said client, said method comprising the steps of:

storing an allowable relative load value common to all of said servers in said management computer;

receiving from each of said servers at said management computer an absolute load value indicative of a countable absolute load on said server calculated on the basis of the number of processing requests received by said server from said client, and a relative load value indicative of a relative load on said server depending on a processing capacity of said server;

calculating in said management computer an allowable absolute load value for each of said servers using the received absolute load value, the stored allowable relative load value, and the received relative load value; and transmitting the calculated allowable absolute load value to be used to detect overload of said server to each of said servers, wherein said management computer calculates the allowable absolute load value by multiplying the absolute load value by a ratio of the allowable relative load value to the relative load value.

2. A method for controlling a management computer according to claim 1, wherein:

said relative load value on each of said servers is a utilization ratio for a CPU included in each of said servers, and said absolute load value is the number of processing requests received by each of said servers from said client within a predetermined time period.

3. A method for controlling a management computer according to claim 1, further comprising the steps of:

repeatedly receiving at said management computer the absolute load value and the relative load value from each of said servers;

calculating in said management computer the allowable absolute load value for each of said servers each time said management computer receives the absolute load value and the relative load value; and transmitting the calculated allowable absolute load value for each of said servers from said management computer to each of said servers each time the allowable absolute load value is calculated in said management computer.

4. A method for controlling a management computer according to claim 1, wherein said management computer is connected to a plurality of servers for permitting communications therebetween, and stores an allowable relative load value on each of said plurality of servers, each of said servers transmitting to a client a result of processing for each processing request sent from said client, said method further comprising the steps of:

receiving at said management computer the absolute load value, and the relative load value from each of said servers;

calculating an allowable absolute load value for each of said servers in said management computer; and transmitting the allowable absolute load value for each of said servers from said management computer to each of said server.

5. The method for controlling a management computer according to claim 1, wherein:

the management computer obtains the allowable absolute load value for each of said servers by executing a predetermined calculation which inputs at least the received absolute load value, the stored allowable relative load value and the received relative load value and outputs the allowable absolute load value corresponding to the allowable relative load value.

6. A method for controlling a management computer connected to one or more servers for permitting communication therebetween, wherein each of said servers transmits to a client a result of processing for each processing request sent from said client, said method comprising the steps of:

storing an allowable relative load value common to all of said servers in said management computer;

receiving from each of said servers at said management computer an absolute load value indicative of a countable absolute load on said server calculated on the basis of the number of processing requests received by said server from said client, and a relative load value indicative of a relative load on said server depending on a processing capacity of said server;

calculating in said management computer an allowable absolute load value for each of said servers using the received absolute load value, the stored allowable relative load value, and the received relative load value; and transmitting the calculated allowable absolute load value to be used to detect overload of said server to each of said servers, wherein said management computer is connected to a plurality of servers for permitting communications therebetween, and stores an allowable relative load value on each of said plurality of servers, each of said servers transmitting to a client a result of processing for each processing request sent from said client, said method further comprising the steps of:

receiving at said management computer the absolute load value, and the relative load value from each of said servers;

calculating an allowable absolute load value for each of said servers in said management computer; and transmitting the allowable absolute load value for each of said servers from said management computer to each of said server, wherein said management computer is connected to a load balancer for permitting communications therebetween, said load balancer provided for distributing processing requests sent from said client for transmission to each of said servers, said method further comprising the steps of:

calculating in said management computer a combination of values indicative of a distribution ratio in which said load balancer distributes processing requests received from said client to said respective servers, based on the absolute load value and the relative load value from each of said servers; and transmitting the combination of values indicative of the calculated distribution ratio from said management computer to said load balancer.

7. A method for controlling a management computer according to claim 6, wherein:

said combination of values indicative of the distribution ratio indicates the ratio of the respective values, each of which is calculated by dividing each absolute load value received from each of said servers by each relative load value.

8. A method for controlling a management computer according to claim 6, further comprising the steps of:

repeatedly receiving at said management computer the absolute load value and the relative load value from each of said servers;

calculating in said management computer the combination of values indicative of the distribution ratio each time said management computer receives the absolute load value and the relative load value; and transmitting the calculated combination of values indicative of the distribution ratio from said management computer to said load balancer each time the combination of values indicative of the distribution ratio is calculated.

9. A method for controlling a management computer according to claim 8, wherein:

said combination of values indicative of the distribution ratio indicates a ratio of respective values, each of which is calculated by dividing the absolute load value received from each of said servers by the relative load value on each of said servers.

10. A method for controlling a management computer according to claim 9, wherein:

said management computer stores each value calculated by dividing the absolute load value calculated for each of said servers at the previous time by the relative load value as a previously calculated allowable absolute load value, and said management computer calculates the combination of values indicative of the distribution ratio based on the values, each of which is calculated by dividing the absolute load value calculated for each of said servers by the relative load value, and the respective previously calculated values thereof.

11. A method for controlling a management computer according to claim 10, wherein:

said combination of values indicative of the distribution ratio indicates a ratio of averages of the respective values, each of which is derived by dividing the absolute load value calculated for each of said servers by the relative load value, and the respective previously calculated values thereof.

12. A method for controlling a management computer connected to one or more servers for permitting communication therebetween, wherein each of said servers transmits to a client a result of processing for each processing request sent from said client, said method comprising the steps of:

storing an allowable relative load value common to all of said servers in said management computer;

receiving from each of said servers at said management computer an absolute load value indicative of a countable absolute load on said server calculated on the basis of the number of processing requests received by said server from said client, and a relative load value indicative of a relative load on said server depending on a processing capacity of said server;

calculating in said management computer an allowable absolute load value for each of said servers using the received absolute load value, the stored allowable relative load value, and the received relative load value; and transmitting the calculated allowable absolute load value to be used to detect overload of said server to each of said servers, further comprising the steps of:

repeatedly receiving at said management computer the absolute load value and the relative load value from each of said servers;

calculating in said management computer the allowable absolute load value for each of said servers each time said management computer receives the absolute load value and the relative load value; and transmitting the calculated allowable absolute load value for each of said servers from said management computer to each of said servers each time the allowable absolute load value is calculated in said management computer, wherein said allowable absolute load value is calculated by said management computer which multiplies the absolute load value by a ratio of the allowable absblute load value to the relative load value.

13. A method for controlling a management computer according to claim 12, wherein:

said management computer stores the allowable absolute load value calculated at the previous time as a previously calculated allowable absolute load value, and said management computer calculates the allowable absolute load value, based on a value calculated by multiplying the absolute load value by a ratio of the allowable relative load value to the relative load value, and the previously calculated allowable absolute load value.

14. A method for controlling a management computer according to claim 13, wherein:

said allowable absolute load value is an average of a value calculated by multiplying the absolute load value by the ratio of the allowable relative load value to the relative load value, and the previously calculated allowable absolute load value.

* * * * *